United States Patent
Ashcraft et al.

(10) Patent No.: US 11,093,401 B2
(45) Date of Patent: Aug. 17, 2021

(54) HAZARD PREDICTION FOR A GROUP OF MEMORY ACCESS INSTRUCTIONS USING A BUFFER ASSOCIATED WITH BRANCH PREDICTION

(71) Applicant: Ampere Computing LLC, Santa Clara, CA (US)

(72) Inventors: Matthew Ashcraft, Belmont, CA (US); Richard W. Thaik, San Jose, CA (US)

(73) Assignee: Ampere Computing LLC, Santa Clara, CA (US)

( * ) Notice: Subject to any disclaimer, the term of this patent is extended or adjusted under 35 U.S.C. 154(b) by 159 days.

(21) Appl. No.: 14/203,896

(22) Filed: Mar. 11, 2014

(65) Prior Publication Data
US 2015/0324203 A1 Nov. 12, 2015

(51) Int. Cl.
*G06F 9/38* (2018.01)
*G06F 12/0862* (2016.01)
*G06F 12/0875* (2016.01)

(52) U.S. Cl.
CPC ........ *G06F 12/0862* (2013.01); *G06F 9/3806* (2013.01); *G06F 9/3834* (2013.01); *G06F 9/3838* (2013.01); *G06F 12/0875* (2013.01)

(58) Field of Classification Search
CPC .......... G06F 9/3842–48; G06F 9/3834; G06F 9/3004–30043
See application file for complete search history.

(56) References Cited

U.S. PATENT DOCUMENTS

| | | | | |
|---|---|---|---|---|
| 5,377,336 A | * | 12/1994 | Eickemeyer | ............ G06F 9/383 711/213 |
| 5,423,014 A | * | 6/1995 | Hinton | .................. G06F 9/3802 711/204 |
| 5,666,506 A | | 9/1997 | Hesson et al. | |
| 6,457,131 B2 | | 9/2002 | Kuemerle | |
| 6,526,499 B2 | | 2/2003 | Palanca et al. | |
| 7,003,648 B2 | | 2/2006 | Chrysos et al. | |
| 7,853,738 B2 | | 12/2010 | Pothireddy et al. | |
| 8,087,029 B1 | | 12/2011 | Lindholm et al. | |

(Continued)

FOREIGN PATENT DOCUMENTS

WO 2011-076602 6/2011

OTHER PUBLICATIONS

International Search Report for International Patent Application No. PCT/US2015/042199 dated Apr. 29, 2016, 3 pages.

(Continued)

*Primary Examiner* — John M Lindlof
(74) *Attorney, Agent, or Firm* — Muncy, Geissler, Olds & Lowe, P.C.

(57) ABSTRACT

Various aspects provide for facilitating prediction of instruction pipeline hazards in a processor system. A system comprises a fetch component and an execution component. The fetch component is configured for storing a hazard prediction associated with a group of memory access instructions in a buffer associated with branch prediction. The execution component is configured for executing a memory access instruction associated with the group of memory access instructions as a function of the hazard prediction entry. In an aspect, the hazard prediction entry is configured for predicting whether the group of memory access instructions is associated with an instruction pipeline hazard.

23 Claims, 14 Drawing Sheets

(56) References Cited

U.S. PATENT DOCUMENTS

| | | | |
|---|---|---|---|
| 8,108,872 B1 | 1/2012 | Lindholm et al. | |
| 8,176,257 B2 | 5/2012 | Wadhawan et al. | |
| 8,468,325 B2 | 6/2013 | Alexander | |
| 2002/0138713 A1* | 9/2002 | Logan | G06F 9/3861 |
| | | | 712/214 |
| 2003/0217251 A1* | 11/2003 | Jourdan | G06F 9/3834 |
| | | | 712/225 |
| 2006/0184738 A1 | 8/2006 | Bridges et al. | |
| 2007/0288725 A1* | 12/2007 | Luick | G06F 9/3828 |
| | | | 712/225 |
| 2013/0298127 A1* | 11/2013 | Meier | G06F 9/3834 |
| | | | 718/100 |
| 2014/0281408 A1 | 9/2014 | Zeng | |

OTHER PUBLICATIONS

Written Opinion for International Patent Application No. PCT/US2015/042199 dated Apr. 29, 2016, 5 pages.

WIPO Application No. PCT/US2015/042199, International Preliminary Report on Patentability, dated Jan. 30, 2018.

* cited by examiner

400

| BTB ENTRY 402a | BRANCH PREDICTION ENTRY 404a | HAZARD PREDICTION ENTRY 406a |
|---|---|---|
| BTB ENTRY 402b | BRANCH PREDICTION ENTRY 404b | HAZARD PREDICTION ENTRY 406b |
| ⋮ | ⋮ | ⋮ |
| BTB ENTRY 402n | BRANCH PREDICTION ENTRY 404n | HAZARD PREDICTION ENTRY 406n |

FIG. 4

HAZARD PREDICTION FOR A GROUP OF MEMORY ACCESS INSTRUCTIONS USING A BUFFER ASSOCIATED WITH BRANCH PREDICTION

TECHNICAL FIELD

The subject disclosure relates generally to processor systems, and more particularly to hazard prediction for a group of memory access instructions using a buffer associated with branch prediction.

BACKGROUND

Conventional processor systems can implement an instruction pipeline to increase throughput of processor instructions (e.g., load instructions and store instructions). For example, an instruction pipeline can be divided into multiple stages (e.g., fetch instruction, decode instruction, execute instruction, write-back instruction, etc.) to allow processing of multiple processor instructions in parallel. In certain implementations, a processor can implement out-of-order execution to execute processor instructions based on availability (e.g., availability of processor instructions) rather than an original program order for the processor instructions. For example, each processor instruction (e.g., load instruction and/or store instruction) can be stored in a data structure when decoding operations associated with processor instructions. The processor instructions (e.g., load instructions and/or stores instructions) can then be permitted to execute out-of-order. As such, a processor can avoid being in an idle state while data is retrieved for a next processor instruction (e.g., a processor can process a next processor instruction as soon as data operands associated with the next processor instruction are available).

However, out-of-order execution can lead to memory order violations (e.g., reordering issues), incorrect data, etc. For example, out-of-order execution can lead to an instruction pipeline hazard (e.g., a read after write (RAW) hazard, a write after read (WAR) hazard, a write after write (WAW) hazard, etc.). Conventionally, if it is determined that a memory order violation (e.g., an instruction pipeline hazard) has occurred, the violating processor instruction (e.g., load instruction or store instruction) and each subsequent processor instruction are re-executed (e.g., the data structure employed for out-of-order execution is erased and/or reformatted). Therefore, accuracy and/or efficiency of conventional techniques for executing processor instructions (e.g., load instructions and/or store instructions) out-of-order can be improved.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises a fetch component and an execution component. The fetch component is configured for storing a hazard prediction entry associated with a group of memory access instructions in a buffer associated with branch prediction. The execution component is configured for executing a memory access instruction associated with the group of memory access instructions as a function of the prediction entry. In an aspect, the hazard prediction entry is configured for predicting whether a group of memory access instructions is associated with an instruction pipeline hazard.

In another example embodiment, a method comprises storing a prediction entry, for predicting whether a group of memory access instructions is associated with an instruction pipeline hazard, in a buffer associated with branch prediction. Furthermore, the method comprises executing a memory access instruction associated with the group of memory access instructions as a function of the prediction entry.

In yet another example embodiment, a system includes a means for storing a hazard prediction entry, for predicting whether a group of memory access instructions is associated with an instruction pipeline hazard, in a buffer associated with branch prediction. The system also includes a means for executing a memory access instruction associated with the group of memory access instructions as a function of the hazard prediction entry.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

BRIEF DESCRIPTION OF THE DRAWINGS

FIG. 4 is a block diagram illustrating an example, non-limiting embodiment of a branch target buffer in accordance with various aspects described herein.

DETAILED DESCRIPTION

Figure 1:
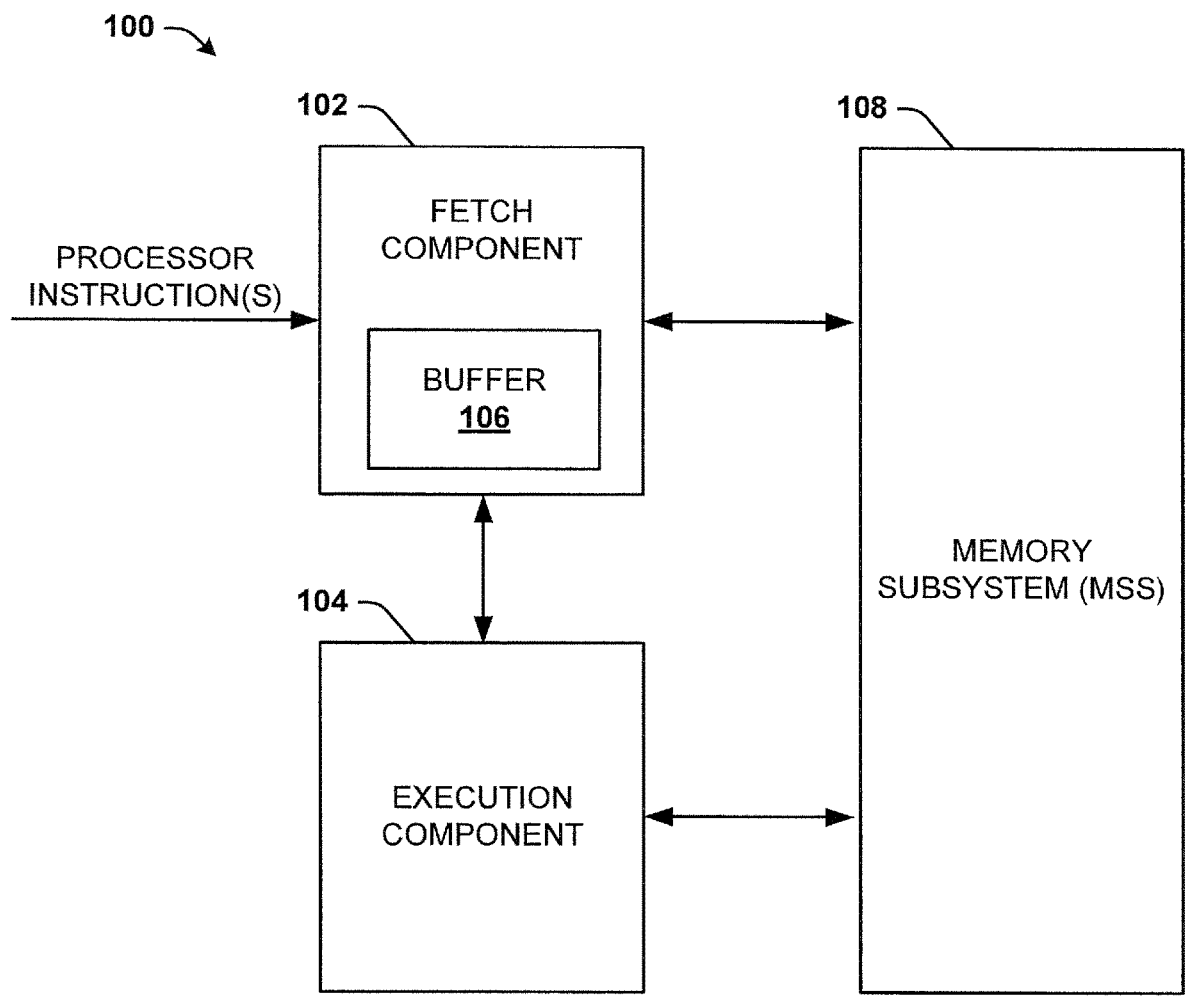
FIG. 1 is a block diagram illustrating an example, non-limiting embodiment of a processor system in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various aspects of the present disclosure facilitate generation and/or management of hazard predictions (e.g., instruction pipeline hazard predictions, memory ordering pipeline hazards, predictions for ordering violation, predictions for load/store ordering violations, predictions for memory order violations, etc.) in a processor system. For example, hazard predictions for processor instructions can be stored in a branch prediction pipeline rather than a cache or a separate data structure in a load/store pipeline (e.g., an execution pipeline). In an aspect, hazard predictions for processor instructions can be stored in a branch target buffer (BTB). In one example, hazard predictions for processor instructions can be tagged as aggressive or conservative and/or stored in the branch prediction pipeline (e.g., the BTB) as an aggressive value or a conservative value. In an aspect, the BTB can be associated with more processor instructions than an instruction cache implemented in the branch prediction pipeline. As such, a history (e.g., an execution history and/or an memory hazard history) associated with processor instructions can be generated. Therefore, instruction pipeline hazards and/or memory ordering pipeline hazards (e.g., a read after read (RAR) hazard, a read after write (RAW) hazard, a write after read (WAR) hazard, a write after write (WAW) hazard, etc.) associated with memory order violations and/or load/store ordering (e.g., allocating load instructions, store instructions and/or other types of memory access instructions to a queue buffer) can be minimized. Furthermore, hazard prediction cost (e.g., data structure size for hazard predictions) can be reduced. Moreover, complexity (e.g., difficulty) of implementing hazard prediction in a processor system can be reduced.

Turning now to FIG. 1, a block diagram illustrating an example, non-limiting embodiment of a processor system for facilitating hazard prediction (e.g., management and/or generation of hazard predictions) in accordance with various aspects described herein is shown. System 100 includes a fetch component 102 and an execution component 104. In an aspect, the fetch component 102 can be implemented as a front end component. For example, the fetch component 102 can be implemented as an instruction cache and fetch (ICF) component. In another aspect, the execution component 104 can be implemented as a back end component. For example, the execution component 104 can be implemented as at least one load-store (LSU). The fetch component 102 can include a buffer 106. In an aspect, the buffer 106 can be associated with branch prediction and hazard prediction (e.g., the buffer 106 can be configured for storing information associated with branch prediction and hazard prediction). For example, the buffer 106 can be employed to predict a next processor instruction fetch (e.g., branch prediction) and to predict whether a processor instruction (e.g., a memory access instruction, a load instruction, a store instruction, etc.) is associated with an instruction pipeline hazard and/or a memory ordering pipeline hazard (e.g., hazard prediction). In one example, the buffer 106 can be implemented as a cache memory. In another example, the buffer 106 can be a BTB.

The system 100 can be implemented in a processor system. For example, the system 100 can be implemented in a multiprocessor system and/or a shared memory system. In one example, the system 100 can be implemented in a memory management apparatus. In an aspect, a processor, e.g., a central processing unit (CPU), can implement the system 100. For example, the system 100 can be implemented to facilitate an instruction cycle (e.g., a fetch-and-execute cycle) of a CPU.

The system 100 can be configured to execute processor instructions (e.g., load instructions, store instructions and/or other types of memory access instructions) out-of-order (e.g., the system 100 can implement out-of-order execution). Additionally, the system 100 can be configured to predict memory order violations (e.g., memory ordering pipeline hazards) and/or instruction pipeline hazards based on hazard prediction entries stored in the buffer 106 (e.g., a buffer associated with branch prediction). A load instruction can be a processor instruction to read data from memory. A store instruction can be a processor instruction to update data (e.g., write data) to memory.

The fetch component 102 can receive one or more processor instructions (e.g., PROCESSOR INSTRUCTION(S) shown in FIG. 1). For example, the fetch component 102 can receive one or more memory access instructions. In one example, the fetch component 102 can receive a load instruction (e.g., a load operation), a store instruction (e.g., a store operation) and/or another type of memory access instruction (e.g., another type of memory access operation). In an aspect, the one or more processor instructions can be received from memory (e.g., main memory). In one example, the fetch component 102 can implement at least an instruction cache component (e.g., a Level-1 cache component) and/or an instruction fetch component in addition to the buffer 106. The fetch component 102 can implement a fetch cycle for the memory access instruction (e.g., load instruction, store instruction, another type of memory access instruction, etc.). For example, the fetch component 102 can fetch load/store instructions. The execution component 104 can implement an execute cycle (e.g., out-of-order execution) for the memory access instruction (e.g., load instruction, store instruction, another type of memory access instruction, etc.).

The fetch component 102 can facilitate prediction to predict whether the memory access instruction (e.g., load instruction, store instruction, another type of memory access instruction, etc.) is associated with (e.g., will be associated with) a memory hazard (e.g., an instruction pipeline hazard, a memory ordering pipeline hazard, a load/store ordering violation, etc.). For example, an instruction pipeline hazard and/or a memory ordering pipeline hazard can be a data hazard (e.g., a RAR hazard, a RAW hazard, a WAR hazard, a WAW hazard, etc.). The fetch component 102 can utilize a hazard prediction entry to predict whether a group of instructions (e.g., a group of memory access instructions) is associated with a memory hazard (e.g., an instruction pipeline hazard, a memory ordering pipeline hazard, a load/store ordering violation, etc.). For example, the fetch component 102 can utilize a first hazard prediction entry to predict whether a first group of instructions is associated with an instruction pipeline hazard and/or a memory ordering pipeline hazard, a second hazard prediction entry to predict whether a second group of instructions is associated with an instruction pipeline hazard and/or a memory ordering pipeline hazard, etc. A group of instructions can include, but is not limited to, one or more groups of load instructions, one or more groups of store instructions and/or one or more groups of other memory access instructions. As such, the fetch component 102 can utilize (e.g., store) one or more hazard prediction entries. The one or more hazard prediction entries can be stored in the buffer 106 (e.g., a buffer associated with branch prediction). In an aspect, the buffer 106 can be configured as a BTB. In one example, the BTB can be a branch target cache. The BTB can be configured to store a predicted address for a next instruction after a branch (e.g., after initiation of a different instruction sequence). For example, the BTB can be configured to predict a next instruction address before a particular instruction is decoded. In an aspect, a column of the BTB can include a set of instruction addresses (e.g., addresses of one or more branches). In another aspect, another column of the BTB can include a set of predictions for a next program counter after a branch. In yet another aspect, yet another column of the BTB can include prediction state information (e.g., prediction state bits). Therefore, the BTB can be configured to identify a branch and/or predict a target of a branch instruction. Additionally, the BTB can be configured to store a hazard prediction for an instruction (e.g., a group of instructions). As such, a branch prediction entry and a hazard prediction entry for each group of instructions (e.g., each group of memory access instructions) can be stored in a BTB. Accordingly, a BTB entry can be associated with branch prediction (e.g., one or more branch predictors) and hazard prediction (e.g., one or more hazard prediction entries) to predict whether a group of instructions is associated with an instruction pipeline hazard and/or a memory ordering pipeline hazard. In an aspect, the buffer 106 (e.g., the BTB) can store more instructions than an instruction cache associated with (e.g., included in) the fetch component 102.

The execution component 104 can execute an instruction associated with the group of instructions (e.g., the first group of instructions, the second group of instructions, etc.) as a function of the hazard prediction entry. In one example, the execution component 104 can execute each memory access instruction (e.g., each load instruction, each store instruction, etc.) in a group of memory access instructions (e.g., a group of load instructions, a group of store instructions, etc.) as a function of a hazard prediction entry associated with each memory access instruction (e.g., the group of memory access instructions). It is to be appreciated that the execution component 104 can execute another type of memory access instruction in a group of instructions as a function of a hazard prediction entry associated with each instruction (e.g., the group of instructions). In an aspect, the group of instructions (e.g., the first group of instructions, the second group of instructions, etc.) can be stored in an instruction cache. As such, the execution component 104 can receive and/or execute instruction(s) received from an instruction cache. In an aspect, the execution component 104 can implement out-of-order execution to execute the instruction(s). In one example, the execution component 104 can be associated with a queue buffer (e.g., a load buffer) to store the group of instructions and/or execute the group of instructions out-of-order.

In an aspect, the hazard prediction entries stored in the buffer 106 can be updated as a function of instruction dependencies an instruction pipeline hazard and/or memory ordering pipeline hazard. For example, a particular hazard prediction entry stored in the buffer 106 can be updated based at least on dependency (e.g., data dependency) between a load instruction associated with the particular hazard prediction entry and one or more store instructions associated with the load instruction (e.g., a particular hazard prediction entry stored in the buffer 106 can be updated based on speculative execution of a load instruction). Additionally or alternatively, a particular hazard prediction entry stored in the buffer 106 can be updated based on whether a memory access instruction (e.g., a load instruction, a store instruction, another type of memory access instruction, etc.) associated with the particular hazard prediction is associated with an instruction pipeline hazard and/or a memory ordering pipeline hazard. As such, a hazard prediction entry for a group of memory access instructions (e.g., group of load instructions, group of store instructions, etc.) can be updated in the buffer 106 at least in response to a determination that an instruction pipeline hazard and/or a memory ordering pipeline hazard is associated with a memory access instruction included in the group of memory access instructions.

The buffer 106 can facilitate prediction to speculate whether one or more instructions are associated with an instruction pipeline hazard and/or a memory ordering pipeline hazard. Each hazard prediction value stored in the buffer 106 can be associated with likelihood of an instruction pipeline hazard and/or a memory ordering pipeline hazard for a group of instructions (e.g., a group of memory access instructions). For example, a particular hazard prediction value can correspond to a higher likelihood of an instruction pipeline hazard and/or a memory ordering pipeline hazard. As such, a hazard prediction value can be determined based on likelihood of an instruction pipeline hazard and/or a memory ordering pipeline hazard. In an aspect, each hazard prediction entry stored in the buffer 106 can be assigned a hazard prediction value (e.g., a bit value). For example, an aggressive value (e.g., a first bit value) or a conservative value (e.g., a second bit value) can be assigned to each hazard prediction entry in the buffer 106. In one example, each hazard prediction entry stored in the buffer 106 can be assigned a single bit value. For example, an aggressive value can be a bit value equal to "1" (or a bit value equal to "0") and a conservative value can be a bit value equal to "0" (or a bit value equal to "1"). However, it is to be appreciated that a hazard prediction entry can include a greater number of bit values (e.g., two bits, three bits, etc.).

Each of the hazard prediction entries in the buffer 106 (e.g., the BTB) can be initially assigned an aggressive value (e.g., a first bit value). In an aspect, memory access instructions (e.g., a group of memory access instructions) associated with the hazard prediction entries can be marked as aggressive (e.g., assigned an aggressive value) in response to the initializing of the hazard prediction entries in the buffer 106. Furthermore, the hazard prediction entries in the buffer 106 (e.g., the BTB) can be updated based on execution of memory access instruction(s) associated with the hazard prediction entries. For example, a conservative value (e.g., a second bit value) can be assigned to a hazard prediction entry in response to a determination that a memory access instruction (e.g., a memory access instruction in a group of memory access instructions associated with the hazard prediction entry) is associated with an instruction pipeline hazard and/or memory ordering pipeline hazard. In another aspect, a conservative value (e.g., a second bit value) can be assigned to a hazard prediction entry in response to a determination that a memory access instruction (e.g., a load instruction) is additionally executed speculatively (e.g., executed before one or more store instructions associated with the load instruction). In another aspect, memory access instructions associated with an updated hazard prediction entry can be marked as conservative (e.g., assigned a conservative value) in response to the updating of the hazard prediction entry in the buffer 106 (e.g., the BTB). In an aspect, the execution component 104 can execute a memory access instruction by employing in-order execution in response to a prediction that the memory access instruction is associated with a memory hazard (e.g., an instruction pipeline hazard and/or a memory ordering pipeline hazard). In an aspect, the execution component 104 can execute a memory access instruction by employing out-of-order execution in response to a prediction that the memory access instruction is not associated with a memory hazard (e.g., an instruction pipeline hazard and/or a memory ordering pipeline hazard).

In an embodiment, the execution component 104 can notify the fetch component 102 via a signal that a memory access instruction is associated with an instruction pipeline hazard and/Ora memory ordering pipeline hazard in response to a determination that the memory access instruction has executed out-of-order. For example, the execution component 104 can generate a signal (e.g., an abort signal) in response to a determination that a memory access instruction is executed speculatively and/or that the memory access instruction is associated with an instruction pipeline hazard and/or a memory ordering pipeline hazard. As such, hazard prediction entries can be updated as a function of a signal generated by the execution component 104 (e.g., an abort signal). In an aspect, the signal (e.g., the abort signal) can comprise a branch checkpoint associated with the instruction pipeline hazard and/or the memory ordering pipeline hazard. Additionally, the signal (e.g., the abort signal) can indicate that the instruction pipeline hazard and/or a memory ordering pipeline hazard occurred because the memory access instruction executed speculatively (e.g., the memory access instruction executed out-of-order, a load instruction should have waited for all previous store instructions associated with the load instruction to execute, etc.).

In an aspect, the fetch component 102 can communicate directly with the execution component 104. In another aspect, the fetch component 102 and/or the execution component 104 can be coupled to a memory subsystem (MSS) 108. The MSS 108 can include one or more memory components (e.g., one or more cache memories, one or more components associated with virtual memory, etc.) and/or one or more controllers. However, it is to be appreciated that the MSS 108 can include additional components. In one embodiment, the MSS 108 can be associated with a Level-1 cache, a Level-2 cache and/or main memory.

Figure 2:
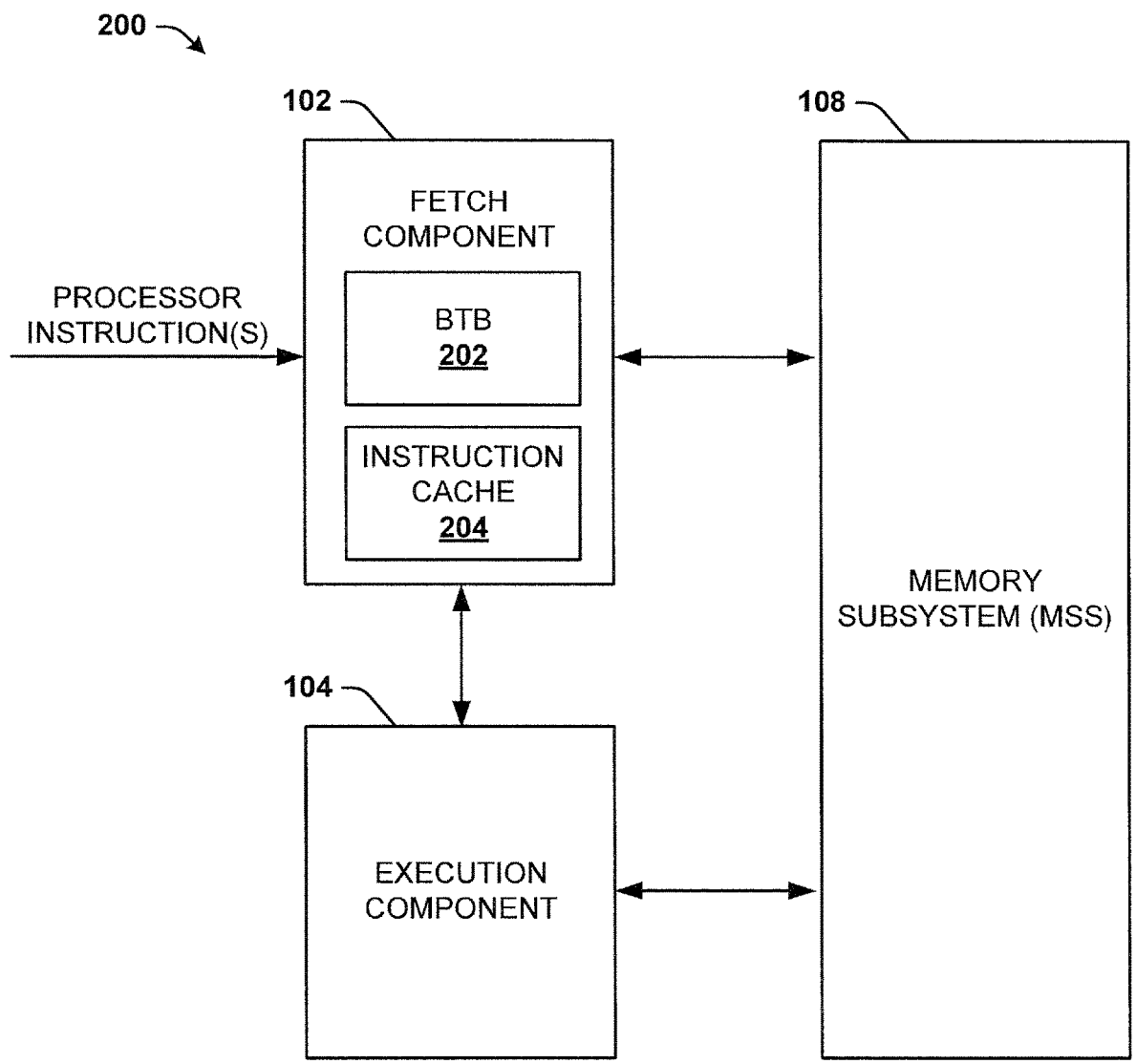
FIG. 2 is a block diagram illustrating an example, non-limiting embodiment of a fetch component in a processor system in accordance with various aspects described herein.

Referring to FIG. 2, a block diagram illustrating an example, non-limiting embodiment of a system in accordance with various aspects described herein is shown. System 200 can include the fetch component 102 and the execution component 104. In an aspect, the fetch component 102 can directly communicate with the execution component 104. In another aspect, the fetch component 102 and/or the execution component 104 can be coupled to the MSS 108. The fetch component 102 can include a branch target buffer (BTB) 202 and an instruction cache 204. For example, the BTB 202 can correspond to the buffer 106.

In an aspect, the BTB 202 can be implemented as a cache memory (e.g., a branch target cache). The BTB 202 can be associated with branch prediction and hazard prediction. For example, the BTB 202 can facilitate branch prediction and memory hazard prediction (e.g., instruction pipeline hazard prediction, memory ordering pipeline hazard prediction, etc.). As such, the BTB 202 can store one or more hazard predictions (e.g., one or more hazard prediction values) associated with instruction pipeline hazard(s) and/or memory ordering pipeline hazard(s). For example, the BTB 202 can generate and/or store a hazard prediction value (e.g., an instruction pipeline hazard prediction value, a memory ordering pipeline hazard value) for one or more memory access instructions. In one example, the BTB 202 can implement a hash table to store the one or more hazard prediction values. As such, the BTB 202 can provide a hazard prediction to speculate whether a memory access instruction will have an instruction pipeline hazard and/or a memory ordering pipeline hazard when executed. As such, the execution component 104 can perform load/store ordering (e.g., execute memory access instructions) based at least in part on instruction pipeline hazard predictions and/or memory ordering pipeline hazard predictions (e.g., the one or more hazard prediction values) stored in the BTB 202.

A BTB entry of the BTB 202 can be associated with one or more memory access instructions (e.g., a BTB entry of the BTB 202 can be associated with multiple memory access instructions). The BTB 202 can include a plurality of fields. For example, each BTB entry in the BTB 202 can include at least a branch prediction field and a hazard prediction field. In an aspect, each hazard prediction field of the BTB 202 can be initialized with an aggressive value (e.g., a value to permit memory access instructions, load instructions, store instructions, etc. to execute immediately). As such, each memory access instruction associated with a particular hazard prediction field can execute speculatively. In another aspect, a hazard prediction field of the BTB 202 can be updated as a function of execution of one or more memory access instructions associated with the hazard prediction field, an instruction pipeline hazard associated with the one or more memory access instructions and/or a memory ordering pipeline hazard associated with the one or more memory access instructions. For example, a hazard prediction field of the BTB 202 can be updated with a conservative value (e.g., a value to not permit memory access instructions to execute immediately). As such, each memory access instruction (e.g., a group of memory access instructions) associated with a particular hazard prediction field can execute after waiting for associated store instruction to execute. In one example, an aggressive value can be a first bit value (e.g., a single bit value) and a conservative value can be a second bit value (e.g., a different single bit value). As such, the BTB 202 can store information associated with execution of one or more memory access instructions, instruction pipeline hazards associated with the one or more memory access instructions and/or memory ordering pipeline hazards associated with the one or more memory access instructions.

In another aspect, the BTB 202 can facilitate branch prediction in addition to the hazard prediction. For example, the BTB 202 can be implemented to predict a next fetch in an instruction pipeline. The BTB 202 can store one or more branch prediction values. For example, the BTB 202 can store one or more branch predictions associated with a path of a branch (e.g., information regarding whether a next sequence of data will be taken) and/or information utilized by a branch. As such, a branch prediction pipeline associated with the BTB 202 can facilitate hazard prediction (e.g., prediction of instruction pipeline hazards, prediction of memory ordering pipeline hazards, etc.) and/or branch prediction.

The instruction cache 204 can store one or more memory access instructions. For example, the instruction cache 204 can store the group of memory access instructions (e.g., the first group of memory access instructions, the second group of memory access instructions, etc.) associated with the BTB 202. The BTB 202 can be configured to store more predictions (e.g., hazard predictions) than memory access instructions stored in the instruction cache 204. As such, the BTB 202 can maintain (e.g., store) a history of memory access instructions (e.g., a history of hazard predictions for memory access instructions) currently stored in the instruction cache 204 and/or other memory access instructions not stored in the instruction cache 204 (e.g., previously stored in the instruction cache 204, stored in another cache, etc.). In an aspect, the one or more memory access instructions stored in the instruction cache 204 can be transmitted to the execution component 104 for execution.

Figure 3:
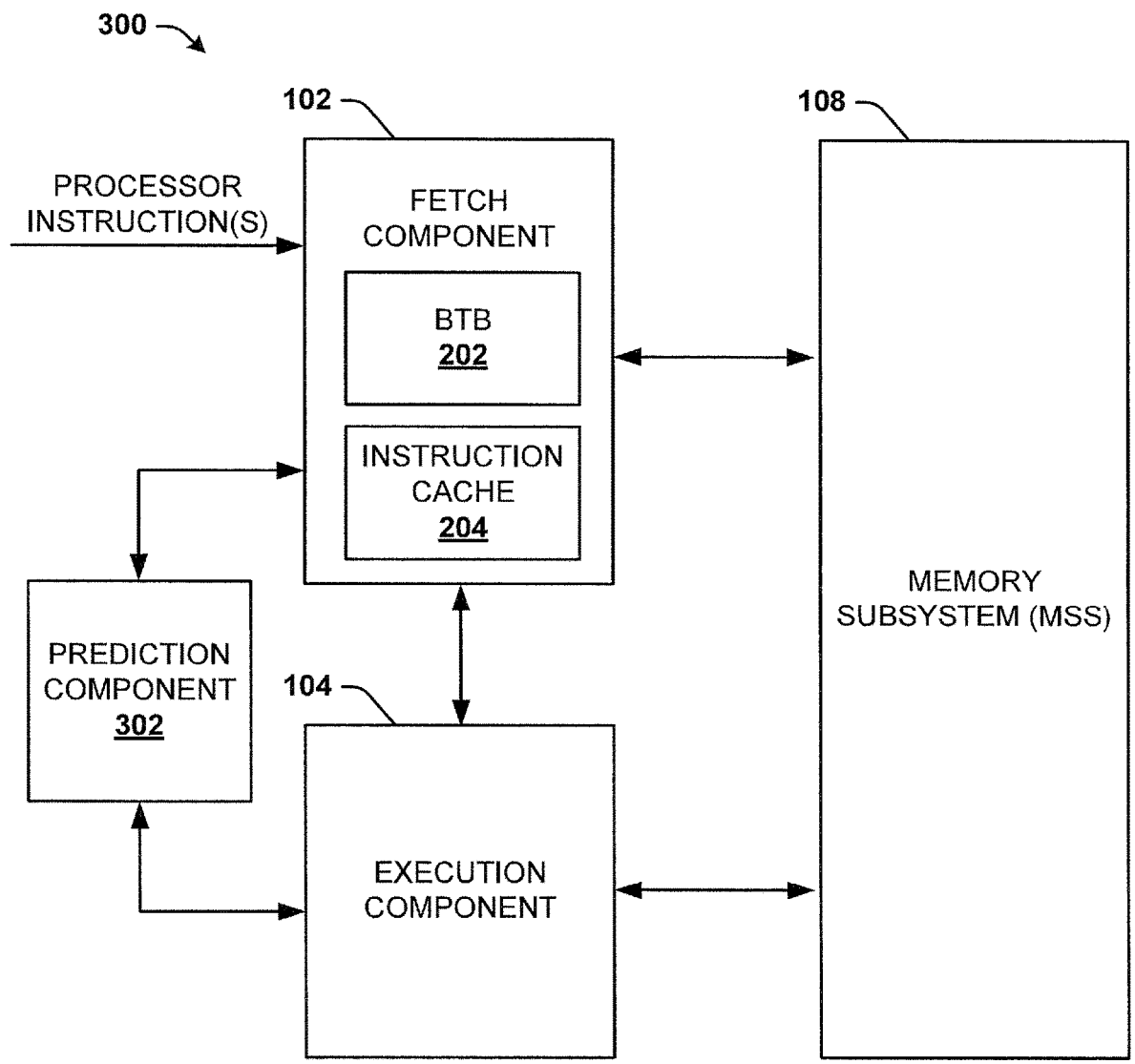
FIG. 3 is a block diagram illustrating an example, non-limiting embodiment of a prediction component in a processor system in accordance with various aspects described herein.

Referring now to FIG. 3, a block diagram illustrating an example, non-limiting embodiment of a system in accordance with various aspects described herein is shown. System 300 can include the fetch component 102 and the execution component 104. The fetch component 102 can include the BTB 202 and/or the instruction cache 204. For example, the BTB 202 can correspond to the buffer 106. The fetch component 102 and/or the execution component 104 can be associated with a prediction component 302. In one example, the prediction component 302 can be implemented separate from the fetch component 102 and the execution component 104. In another example, the fetch component 102 can include the prediction component 302. In yet another example, the execution component 104 can include the prediction component 302.

The prediction component 302 can manage (e.g., initialize and/or update) the BTB 202. For example, the prediction component 302 can manage hazard prediction entries for memory access instructions. The prediction component 302 can initially assign an aggressive value to each of the one or more hazard prediction entries in the BTB 202. As such, memory access instruction(s) associated with the one or more hazard prediction entries in the BTB 202 can execute immediately (e.g., speculatively) without waiting for previous store instructions to execute when assigned an aggressive value.

Furthermore, the prediction component 302 can facilitate dynamic learning and/or updating of hazard prediction entries. For example, the prediction component 302 can monitor the fetch component 102 and/or the execution component 104. In an aspect, the prediction component 302 can monitor the fetch component 102 and/or the execution component 104 to determine whether an instruction pipeline hazard, a memory ordering pipeline hazard and/or a dependency issue exists. The prediction component 302 can determine which memory access instruction is associated with an instruction pipeline hazard, a memory ordering pipeline hazard and/or a dependency issue. Furthermore, the prediction component 302 can determine which hazard prediction entry stored in the BTB 202 is associated with the memory access instruction associated with the instruction pipeline hazard, a memory ordering pipeline hazard and/or a dependency issue (e.g., the prediction component 302 can determine which hazard prediction entry stored in the BTB 202 to update based on the instruction pipeline hazard, the memory ordering pipeline hazard and/or the dependency issue).

The prediction component 302 can assign a conservative value to a hazard prediction entry for a particular memory access instruction of the one or more memory access instructions in response to a determination that an instruction pipeline hazard and/or a memory ordering pipeline hazard has occurred. In an aspect, the prediction component 302 can assign a conservative value to a hazard prediction entry for a particular memory access instruction of the one or more memory access instructions in response to a determination that a particular load instruction is executed speculatively (e.g., before a store instruction associated with the particular load instruction) and that an instruction pipeline hazard and/or a memory ordering pipeline hazard has occurred. For example, load instruction(s) associated with the one or more hazard prediction entries in the BTB 202 can wait to execute until previous store instructions have executed when assigned a conservative value.

In an aspect, the prediction component 302 can tag memory access instructions with a hazard prediction value (e.g., associate and/or assign a hazard prediction value to one or more memory access instructions). For example, in response to a hazard prediction entry in the BTB 202 being initialized and/or updated, the prediction component 302 can associate a hazard prediction value (e.g., an aggressive value or a conservative value) with memory access instruction(s) associated with the hazard prediction entry. Therefore, the prediction component 302 can tag memory access instruction(s) stored in the instruction cache 204 as a function of the hazard prediction entries stored in the BTB 202.

In an aspect, the execution component 104 can notify the fetch component 102 via a signal that a memory access instruction is associated with an instruction pipeline hazard in response to a determination that the memory access instruction has executed out-of-order. For example, the execution component 104 can generate an abort signal in response to a determination that a load instruction is executed speculatively before a store instruction associated with the load instruction and/or that the load instruction is associated with an instruction pipeline hazard and/or a memory ordering pipeline hazard. In one example, the abort signal can include a branch checkpoint associated with a memory access instruction. In another aspect, the prediction component 302 can receive an abort signal (e.g., a signal that indicates that a memory access instruction is associated with an instruction pipeline hazard and/or a memory ordering pipeline hazard) generated by the execution component 104. As such, hazard prediction entries of the BTB 202 can be updated in response to the abort signal generated by the execution component 104.

Referring now to FIG. 4, a block diagram illustrating an example, non-limiting embodiment of a BTB in accordance with various aspects described herein is shown. BTB 400 can include BTB entries 402*a-n*, branch prediction entries 404*a-n* and hazard prediction entries (e.g., instruction pipeline hazard prediction entries, memory ordering pipeline hazard prediction entries, dependence prediction entries, etc.) 406*a-n*. In an example, the BTB 202 and/or the buffer 106 can implement the BTB 400.

The BTB entry 402*a* can be associated with a first group of instructions (e.g., a first group of memory access instructions), the BTB entry 402*b* can be associated with a second group of instructions (e.g., a second group of memory access instructions), etc. For example, the BTB entry 402*a* can be associated with one or more instructions (e.g., one or more instructions stored in the instruction cache 204), the BTB entry 402b can be associated with one or more other instructions (e.g., one or more other instructions stored in the instruction cache 204), etc. Additionally, the BTB entry 402a can be associated with one or more different instructions (e.g., one or more different instructions not stored in the instruction cache 204), the BTB entry 402b can be associated with one or more other different instructions (e.g., one or more other different instructions not stored in the instruction cache 204), etc. In an aspect, a group of instructions (e.g., the first group of instructions, the second group of instructions, etc.) can include one or more groups of load instructions. In another aspect, a group of instructions (e.g., the first group of instructions, the second group of instructions, etc.) can additionally or alternatively include one or more groups of store instructions. In yet another aspect, a group of instructions (e.g., the first group of instructions, the second group of instructions, etc.) can additionally or alternatively include one or more groups of different memory access instructions.

The branch prediction entry 404a can facilitate branch prediction for the BTB entry 402a (e.g., the first group of instructions associated with the BTB entry 402a), the branch prediction entry 404b can facilitate branch prediction for the BTB entry 402b (e.g., the second group of instructions associated with the BTB entry 402b), etc. The hazard prediction entry 406a can facilitate instruction pipeline hazard prediction, memory ordering pipeline hazard prediction and/or data dependency prediction for the BTB entry 402a (e.g., the first group of instructions associated with the BTB entry 402a), the hazard prediction entry 406b can facilitate instruction pipeline hazard prediction, memory ordering pipeline hazard prediction and/or dependency prediction for the BTB entry 402b (e.g., the first group of instructions associated with the BTB entry 402b), etc.

The hazard prediction entries 406a-n can be initialized with an aggressive value (e.g., via the prediction component 302). In an aspect, the prediction component 302 can assign an aggressive value to instructions associated with the hazard prediction entries 406a-n in response to the hazard prediction entries 406a-n being initialized. Furthermore, the hazard prediction entries 406a-n can be updated as a function of execution of one or more instructions associated with the hazard prediction entries 406a-n, a memory ordering pipeline hazard associated with the hazard prediction entries 406a-n and/or an instruction pipeline hazard associated with the hazard prediction entries 406a-n. For example, the hazard prediction entries 406a-n can be updated with a conservative value as a function of execution of one or more instructions associated with the hazard prediction entries 406a-n, an occurrence of a memory ordering pipeline hazard when executing the one or more instructions associated with the hazard prediction entries 406a-n and/or an occurrence of an instruction pipeline hazard when executing the one or more instructions associated with the hazard prediction entries 406a-n. In an aspect, the prediction component 302 can assign a conservative value to one or more instructions associated with a particular hazard prediction entry 406a-n in response to the particular hazard prediction entry 406a-n being updated. In another aspect, the hazard prediction entries 406a-n can be updated as a function of an abort signal (e.g., an abort signal indicating that an instruction pipeline hazard and/or a memory ordering pipeline hazard has occurred).

In a non-limiting example, hazard prediction entry 406a is updated in response to a determination that an instruction associated with BTB entry 402a is associated with a memory ordering pipeline hazard and/or an instruction pipeline hazard. As such, the instruction associated with the BTB entry 402 can be assigned a new value (e.g., a value updated in the hazard prediction entry 406a). Furthermore, other instruction(s) associated with the BTB entry 402a can also be assigned the new value (e.g., the value updated in the hazard prediction entry 406a). Accordingly, if an instruction included in a group of instructions is updated, other instructions included in the group of instructions are also updated.

Figure 5:
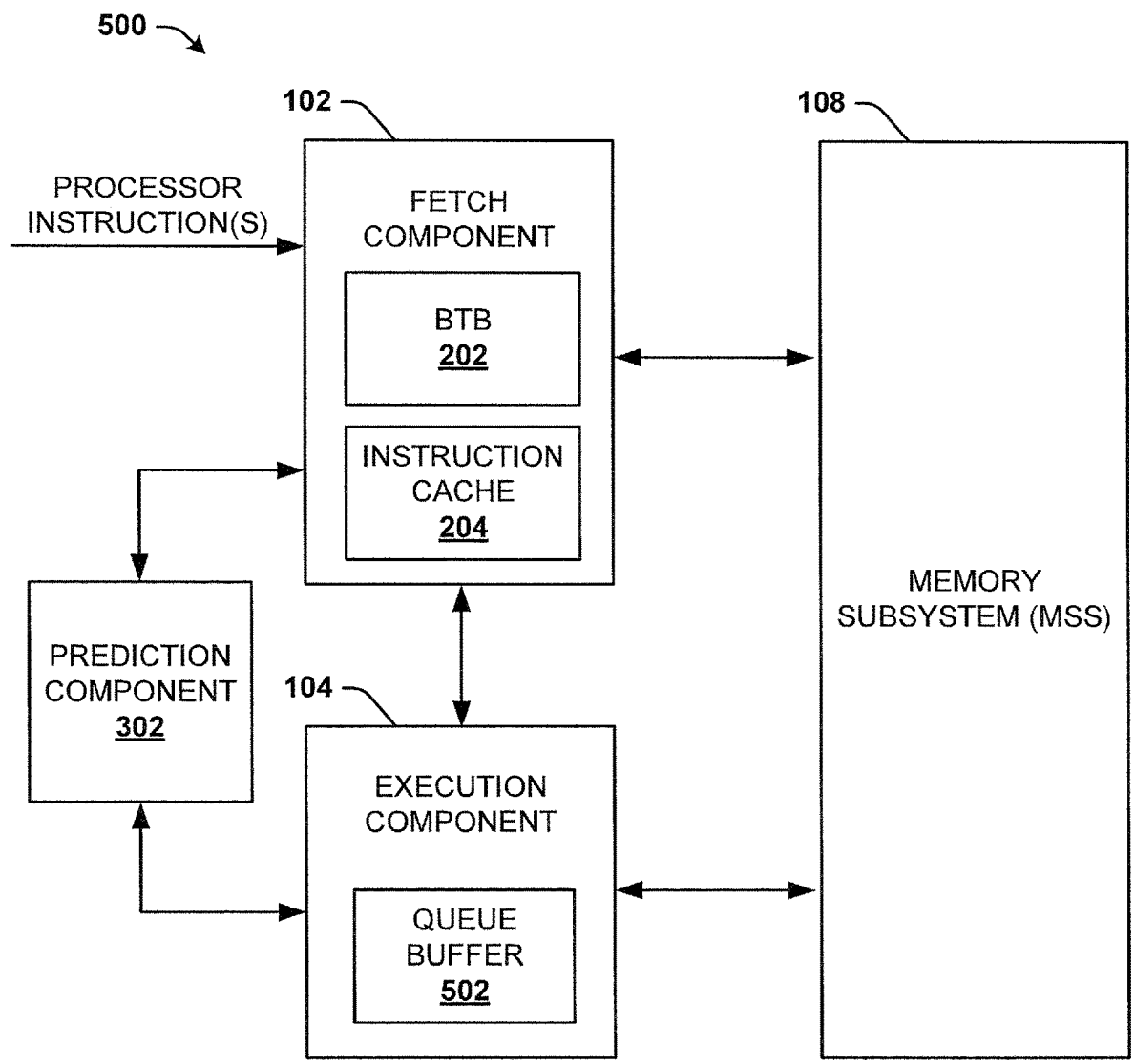
FIG. 5 is a block diagram illustrating an example, non-limiting embodiment of an execution component in a processor system in accordance with various aspects described herein.

Referring now to FIG. 5, a block diagram illustrating an example, non-limiting embodiment of a system in accordance with various aspects described herein is shown. System 500 can include the fetch component 102 and the execution component 104. The fetch component 102 can include the BTB 202 and/or the instruction cache 204. For example, the BTB 202 can correspond to the buffer 106. The fetch component 102 and/or the execution component 104 can be associated with the prediction component 302. The execution component 104 can be associated with a queue buffer 502. In one embodiment, the execution component 104 can include the queue buffer 502. In another embodiment, the queue buffer 502 can be implemented separate from the execution component 104. In one example, the queue buffer 502 can be implemented as load queue (or a load/store queue). In another example, the queue buffer 502 can be implemented as a store forwarding buffer.

The queue buffer 502 can facilitate out-of-order execution of memory access instructions (e.g., load instructions stored in the instruction cache 204, store instructions stored in the instruction cache 204, etc.). For example, memory access instructions (e.g., load instructions) stored in the instruction cache 204 can be allocated to the queue buffer 502. As such, the memory access instructions (e.g., load instructions) allocated to the queue buffer 502 can be executed out-of-order. In an aspect, the memory access instructions (e.g., load instructions) allocated to the queue buffer 502 can be received from the instruction cache 204. In another aspect, the memory access instructions (e.g., load instructions) can be allocated to the queue buffer 502 and/or executed from the queue buffer 502 as a function of the hazard prediction values. As such, ordering between load instructions and store instructions can be performed based at least in part on hazard prediction (e.g., hazard prediction values stored in the BTB 202). Additionally, hazard prediction entries of the BTB 202 (e.g., the buffer 106) can be updated as a function of execution of memory access instructions stored in the queue buffer 502 (e.g., an occurrence of an instruction pipeline hazard and/or a memory ordering pipeline hazard when executing memory access instructions stored in the queue buffer 502 out-of-order).

Figure 6:
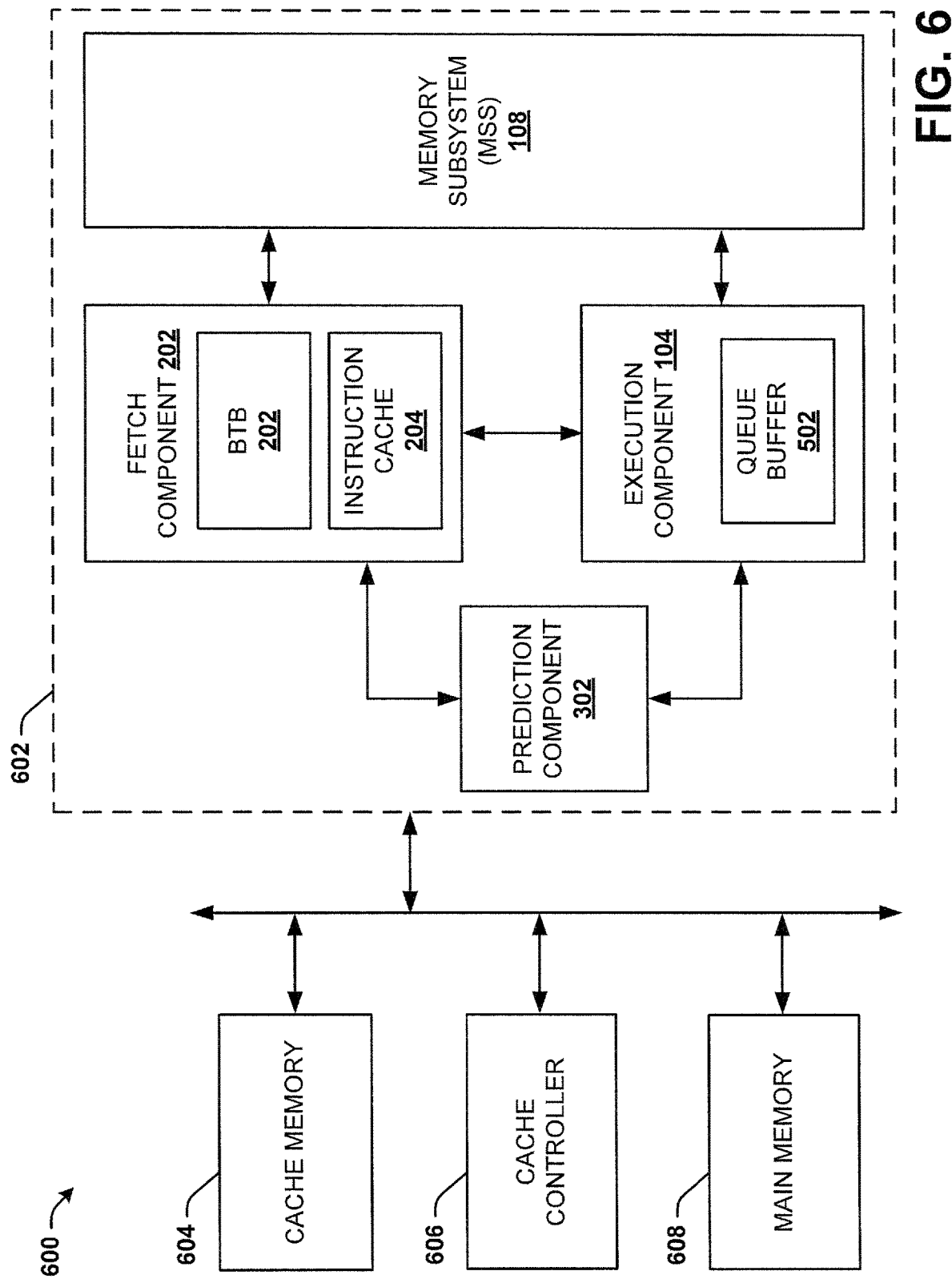
FIG. 6 is a block diagram illustrating an example, non-limiting embodiment of a shared memory system in accordance with various aspects described herein.

Referring now to FIG. 6, a block diagram illustrating an example, non-limiting embodiment of a system in accordance with various aspects described herein is shown. System 600 can include a processor 602, a cache memory 604, a cache controller 606 and a main memory 608. The processor 602 can correspond to the system 100, the system 200, the system 300 or the system 500. For example, the processor 602 can include the fetch component 102, the execution component 104, the buffer 106 (e.g., the BTB 202), the MSS 108, the instruction cache 204, the prediction component 302 and/or the queue buffer 502. In an aspect, the cache memory 604, the cache controller 606 and/or the main memory 608 can be implemented in the MSS 108.

In one example, the cache memory 604 can be implemented as a primary cache (e.g., a Level-1 cache). In another example, the cache memory 604 can be implemented as a secondary cache (e.g., a Level-2 cache). However, it is to be appreciated that the cache memory 604 can be implemented as a different type of cache memory. In another aspect, the cache memory 604 can include one or more levels of cache. The cache controller 606 can manage the cache memory 604 so that the cache memory 604 includes a most recent copy of data that matches data in the main memory 608 (e.g., system memory 608). For example, the cache controller 606 can manage the cache memory 604 so that the cache memory 604 includes a most recent copy of processor instructions that match processor instructions in the main memory 608 (e.g., system memory 608). The main memory 608 can be main memory of a multiprocessor system (e.g., memory that one or more processors can read and write to). The main memory 608 can store one or more memory access instructions (e.g., one or more load instructions, one or more store instructions and/or one or more other memory access instructions). In an aspect, the fetch component 102 can receive memory access instruction(s) (e.g., load instruction(s), a store instruction(s) and/or other types of memory access instructions) from the main memory 608.

Figure 7:
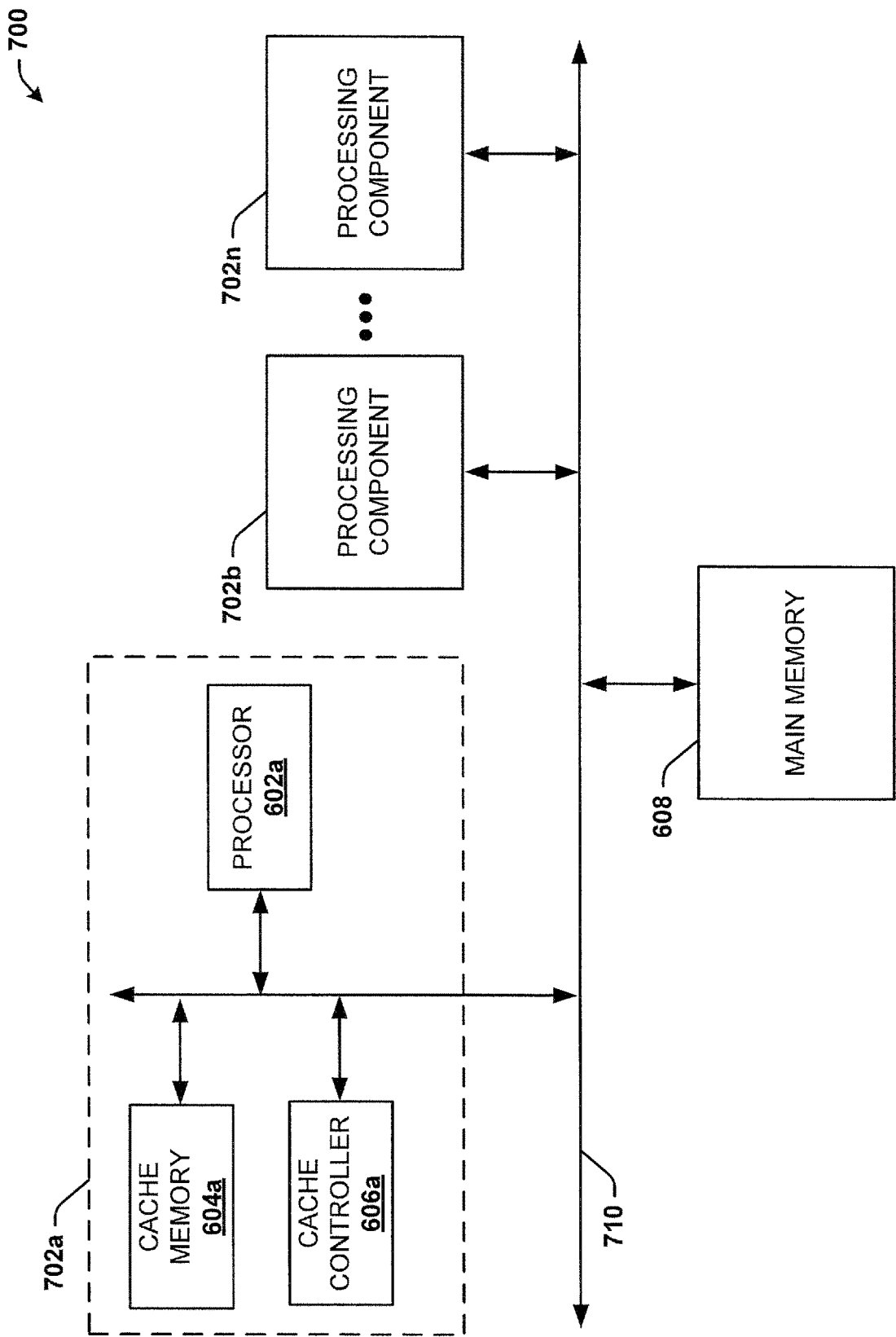
FIG. 7 is a block diagram illustrating an example, non-limiting embodiment of a multiprocessor system in accordance with various aspects described herein.

Referring now to FIG. 7, a block diagram illustrating an example, non-limiting embodiment of a system in accordance with various aspects described herein is shown. In one example, the system 700 can be implemented as a shared-memory multiprocessor system.

System 700 can include one or more processing components 702a-n and the main memory 608. The system 700 can also include one or more processor 602a-n, one or more cache memories 604a-n and one or more cache controllers 606a-n. Each of the one or more processing components 702a-n can include a processor (e.g., processor 602 shown in FIG. 6), a cache memory (e.g., cache memory 604 shown in FIG. 6) and/or a cache controller (e.g., cache controller 606 shown in FIG. 6). For example, the processing component 702a can include processor 602a, cache memory 604a and cache controller 606a, the processing component 702b can include processor 602b, cache memory 604b and cache controller 606b, etc. In one example, a cache controller (e.g. a cache controller 606a-n) can be implemented separate from a processor (e.g., a processor 602a-n). In another example, a processor (e.g., a processor 602a-n) can include a cache controller (e.g., a cache controller 606a-n). In one example, the one or more processors 602a-n can be implemented as processor cores (e.g., processor cores in a multi-core processor).

A copy of data stored in the main memory 608 can be stored in each of the cache memories 604a-n. For example, a copy of processor instructions stored in the main memory 608 can be stored in each of the cache memories 604a-n. Therefore, when data is updated in the main memory 608, the copies of the data stored in each of the cache memories 604a-n can also be updated. As such, the one or more cache controllers 606a-n can manage the cache memories 604a-n so that a most recent copy of data (e.g., processor instructions) is stored in each of the cache memories 604a-n (e.g., a copy of data that matches data in the main memory 608 is stored in each of the cache memories 604a-n). Therefore, cache coherency while executing processor instructions out-of-order can be achieved.

In one implementation, a cache controller, a processor and/or a cache memory in each processing component 702a-n can be coupled via a bus (e.g., a bus 710 and/or a bus coupled to the bus 710). In another implementation, only a cache controller in each processing component 702a-n can be coupled to the bus 710, where the cache controller can additionally be coupled to a processor and a cache memory. As such, a cache controller in each processing component 702a-n can isolate a processor and/or a cache memory from the bus 710.

In view of the example systems described above, methods that may be implemented in accordance with the described subject matter may be better appreciated with reference to the flow charts of FIGS. 8-12. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 8:
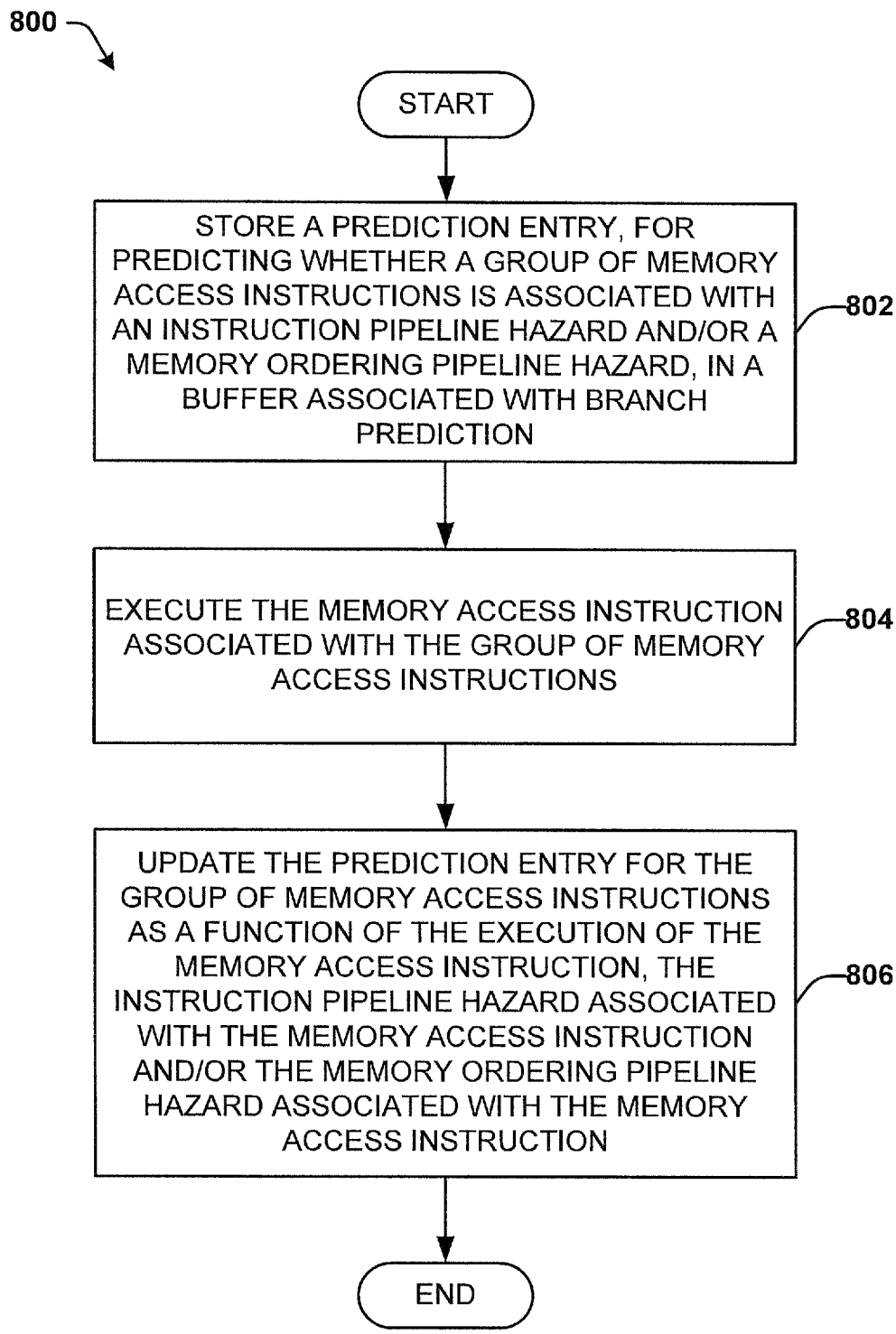
FIG. 8 illustrates a flow diagram of an example, non-limiting embodiment of a method for implementing prediction associated with memory hazards in connection with branch prediction.

Referring to FIG. 8, a flow diagram of an example, non-limiting embodiment of a method for implementing prediction associated with memory hazards in connection with branch prediction is shown. Method 800 can begin at block 802, where a prediction entry, for predicting whether a group of memory access instructions associated with the memory access instruction is associated with an instruction pipeline hazard and/or a memory ordering pipeline hazard, is stored (e.g., by a fetch component 102) in a buffer associated with branch prediction (e.g., buffer 106). For example, a hazard prediction entry, to facilitate predicting whether a group of memory access instructions associated with the memory access instruction is associated with an instruction pipeline hazard and/or a memory ordering pipeline hazard, is stored in a BTB associated with branch prediction.

At block 804, the memory access instruction associated with the group of memory access instructions is executed (e.g., by an execution component 104). For example, the memory access instruction can be stored in an instruction cache (e.g., instruction cache 204). As such, the memory access instruction can be transmitted from the instruction cache to an execution component (e.g., execution component 104) to be executed (e.g., executed out-of-order). In an aspect, the memory access instruction can be stored in a queue buffer (e.g., queue buffer 502) included in the execution component before being executed (e.g., to facilitate out-of-order execution of the memory access instruction).

At block 806, the prediction entry for the group of memory access instructions is updated (e.g., by a prediction component 302) as a function of the execution of the memory access instruction, the instruction pipeline hazard associated with the memory access instruction and/or the memory ordering pipeline hazard associated with the memory access instruction. For example, in response to a determination that a memory access instruction executed speculatively and/or that the memory access instruction is associated with an instruction pipeline hazard and/or a memory ordering pipeline hazard, a prediction entry in the BTB for the group of instructions that includes the memory access instruction is updated. In an aspect, the memory access instruction can be updated in response to an abort signal (e.g., an abort signal being generated that indicates that an instruction pipeline hazard and/or a memory ordering pipeline hazard has occurred).

Figure 9:
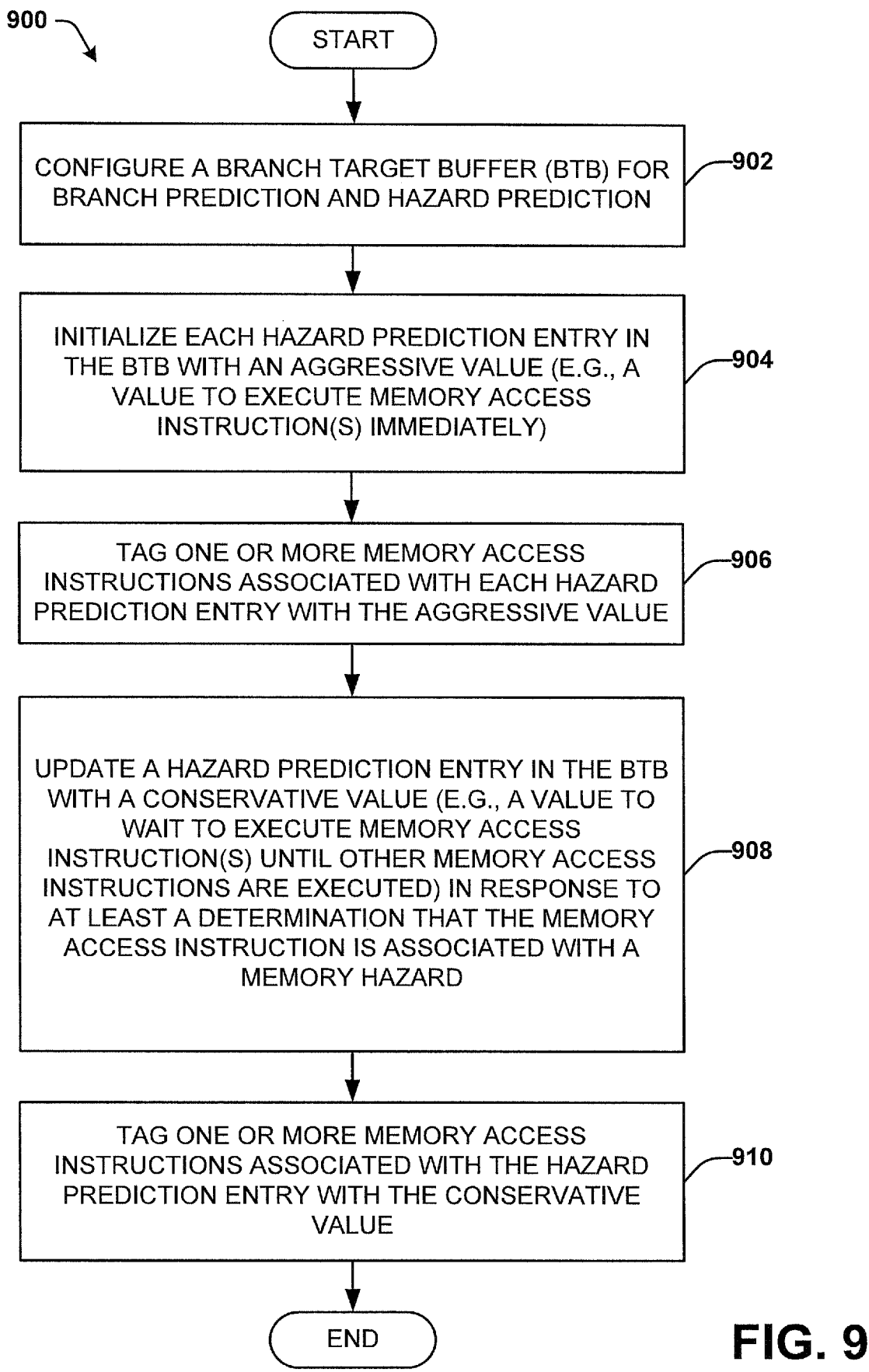
FIG. 9 illustrates a flow diagram of an example, non-limiting embodiment of a method for predicting a hazard associated with load/store execution.

Referring now to FIG. 9, a flow diagram of another example, non-limiting embodiment of a method for predicting a hazard associated with load/store execution is shown. Method 900 can begin at block 902, a branch target buffer (BTB) is configured (e.g., by a fetch component 102 and/or a prediction component 302) for branch prediction and hazard prediction. For example, a BTB 400 can be partitioned to store a branch prediction entry and a hazard prediction entry for each BTB entry 402*a-n* (e.g., each group of memory access instructions).

At block 904, each hazard prediction entry in the BTB is initialized (e.g., by a prediction component 302) with an aggressive value (e.g., a value to execute memory access instruction(s) immediately). For example, hazard prediction entries 406*a-n* can be initialized with an aggressive value (e.g., a value to permit one or more memory access instructions associated with a particular hazard prediction entry 406*a-n* to execute immediately).

At block 906, one or more memory access instructions associated with each hazard prediction entry are tagged (e.g., by a prediction component 302) with the aggressive value. For example, a first group of memory access instructions associated with hazard prediction entry 406*a* is tagged with an aggressive value, a second group of memory access instructions associated with hazard prediction entry 406*b* is tagged with an aggressive value, etc.

At block 908, a hazard prediction entry in the BTB is updated (e.g., by a prediction component 302) with a conservative value (e.g., a value to wait to execute memory access instruction(s) until other memory access instructions are executed) in response to at least a determination the memory access instruction is associated with a memory hazard. For example, in response to a determination that a memory access instruction (e.g., a load instruction) associated with a particular hazard prediction entry 406*a-n* (e.g., hazard prediction entry 406*a*) is associated with an instruction pipeline hazard and/or a memory ordering pipeline hazard, the particular hazard prediction entry 406*a-n* (e.g., hazard prediction entry 406*a*) associated with the memory access instruction can be updated with a conservative value (e.g., a value to wait to execute one or more memory access instructions associated with a particular hazard prediction entry 406*a-n* until previous memory access instructions associated with the one or more memory access instructions are executed). As such, each memory access instruction (e.g., group of memory access instructions) associated with the particular hazard prediction entry 406*a-n* (e.g., hazard prediction entry 406*a*) can be updated in response to a at least a determination that the memory access instruction associated with an instruction pipeline hazard and/or a memory ordering pipeline hazard.

At block 910, one or more memory access instructions associated with the hazard prediction entry are tagged (e.g., by a prediction component 302) with the conservative value. For example, each memory access instruction (e.g., the group of memory, access instructions) associated with the particular hazard prediction entry 406*a-n* (e.g., hazard prediction entry 406*a*) can be tagged with the conservative value.

Figure 10:
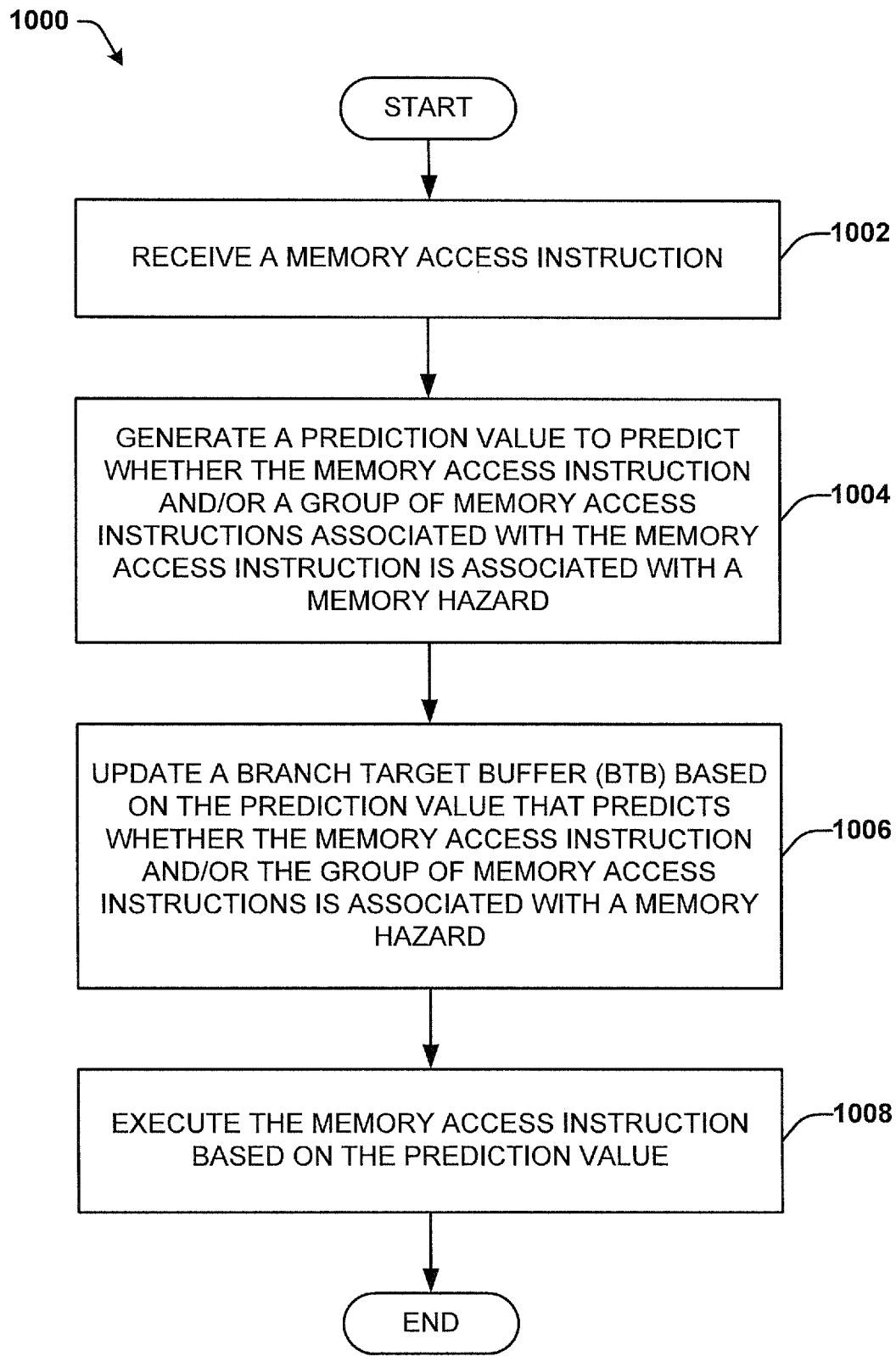
FIG. 10 illustrates a flow diagram of an example, non-limiting embodiment of a method for employing a branch target buffer (BTB) for hazard prediction.

Referring now to FIG. 10, a flow diagram of an example, non-limiting embodiment of a method for employing a BTB for hazard prediction is shown. Method 1000 can begin at block 1002, where a memory access instruction is received (e.g., by fetch component 102). For example, a memory access instruction (e.g., a processor instruction) in an instruction pipeline can be received. In an aspect, the memory access instruction can be received from a main memory (e.g., main memory 608).

At block 1004, a prediction value is generated (e.g., by a prediction component 302) to predict whether a memory access instruction and/or a group of memory access instructions associated with the memory access instruction is associated with a memory hazard. For example, an aggressive value or a conservative value can be generated to predict whether a memory access instruction and/or a group of memory access instructions associated with the memory access instruction is associated with an instruction pipeline hazard and/or a memory ordering pipeline hazard.

At block 1006, a branch target buffer (BTB) is updated (e.g., by a prediction component 302) based on the prediction value that predicts whether the memory access instruction and/or the group of memory access instructions is associated with a memory hazard. For example, prediction value can be stored in a BTB entry (e.g., a BTB entry associated with a group of memory access instructions). As such, a prediction for more than one memory access instruction can be updated based on the prediction value that predicts whether the memory access instruction is associated with an instruction pipeline hazard and/or a memory ordering pipeline hazard. In an aspect, the prediction value can be initially set as an aggressive value. As such, the prediction value can be updated as a conservative value based on the prediction value that predicts whether the memory access instruction is associated with an instruction pipeline hazard and/or a memory ordering pipeline hazard.

At block 1008, the memory access instruction is executed based on the prediction value. For example, if the prediction value is set as an aggressive value, the memory access instruction can be executed immediately. In another example, if a prediction value is a conservative value, a load instruction can wait to be executed until previous store instruction(s) associated with the load instruction are executed.

Figure 11:
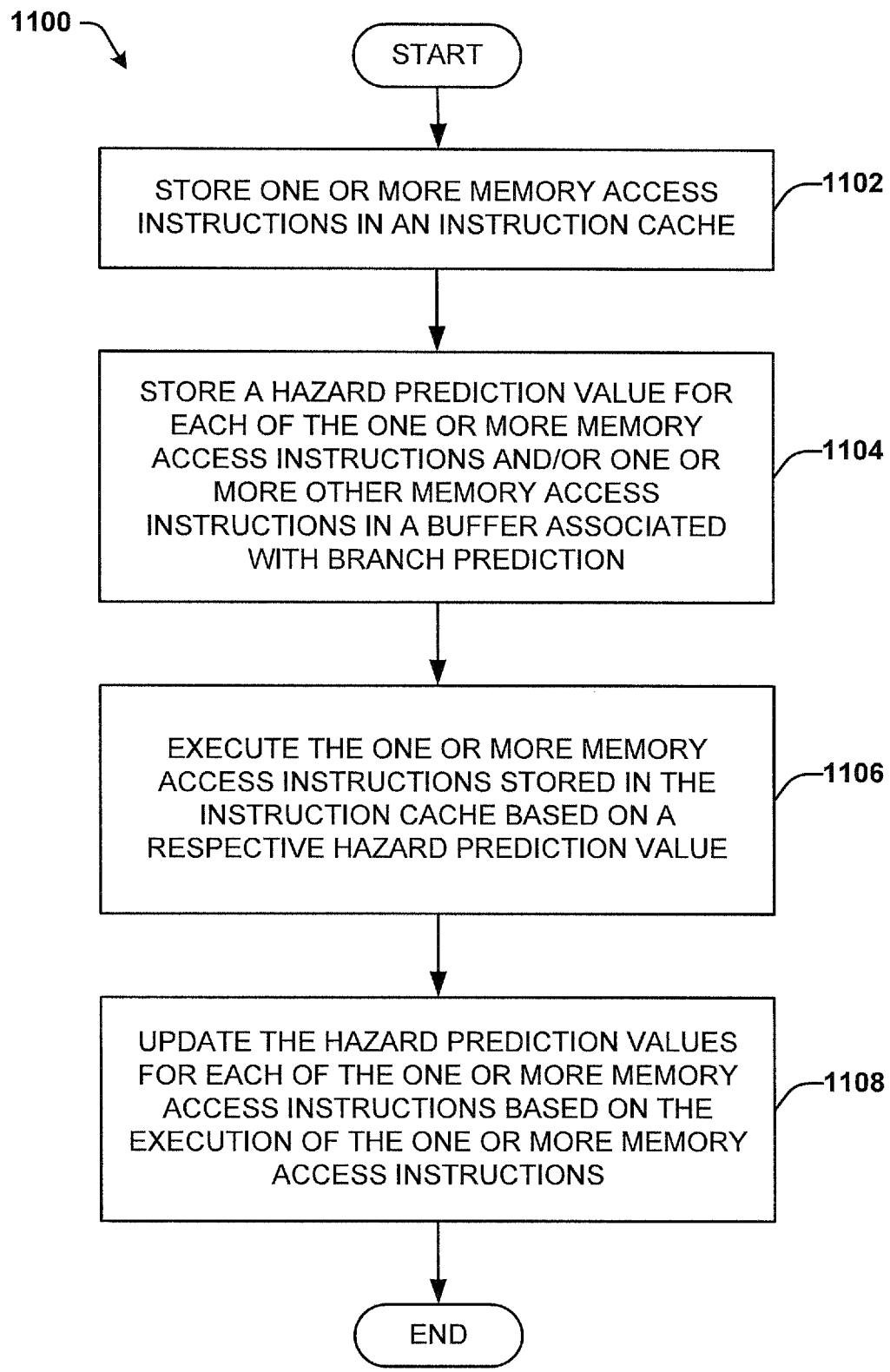
FIG. 11 illustrates a flow diagram of an example, non-limiting embodiment of a method for implementing a BTB and an instruction cache to facilitate hazard prediction.

Referring now to FIG. 11, a flow diagram of an example, non-limiting embodiment of a method for implementing a BTB and an instruction cache to facilitate hazard prediction is shown. Method 1100 can begin at block 1102, where one or more memory access instructions are stored in an instruction cache (e.g., via a fetch component 102). For example, one or more memory access instructions can be stored in the instruction cache 204 included in the fetch component 102.

At block 1104, a hazard prediction value for each of the one or more memory access instructions and/or one or more other memory access instructions are stored in a buffer associated with branch prediction (e.g., via a fetch component 102). For example, a hazard prediction value for each of the one or more memory access instructions stored in the instruction cache 204 and/or one or more other memory access instructions not stored in the instruction cache 204 can be stored in the BTB 202. As such, the BTB 202 can include more memory access instructions than memory access instructions stored in the instruction cache 204. Therefore, a history of memory access instructions and/or BTB entries can be generated.

At block 1106, the one or more memory access instructions stored in the instruction cache are executed (e.g., via an execution component) based on a respective hazard prediction value. For example, the one or more memory access instructions stored in the instruction cache 204 can be transmitted to the execution component 104. In an aspect, the one or more memory access instructions can be stored in the queue buffer 502 prior to being executed (e.g., the one or more memory access instructions can be executed out of order).

At 1108, the hazard prediction values for each of the one or more memory access instructions are updated (e.g., via a prediction component 302) based on the execution of the one or more memory access instructions. For example, the prediction component 302 can monitor execution of the one or more memory access instructions to determine whether an instruction pipeline hazard and/or a memory ordering pipeline hazard has occurred. In response to a determination that an instruction pipeline hazard and/or a memory ordering pipeline hazard has occurred, a hazard prediction entry for a memory access instruction associated with the instruction pipeline hazard and/or the memory ordering pipeline hazard can be updated.

Figure 12:
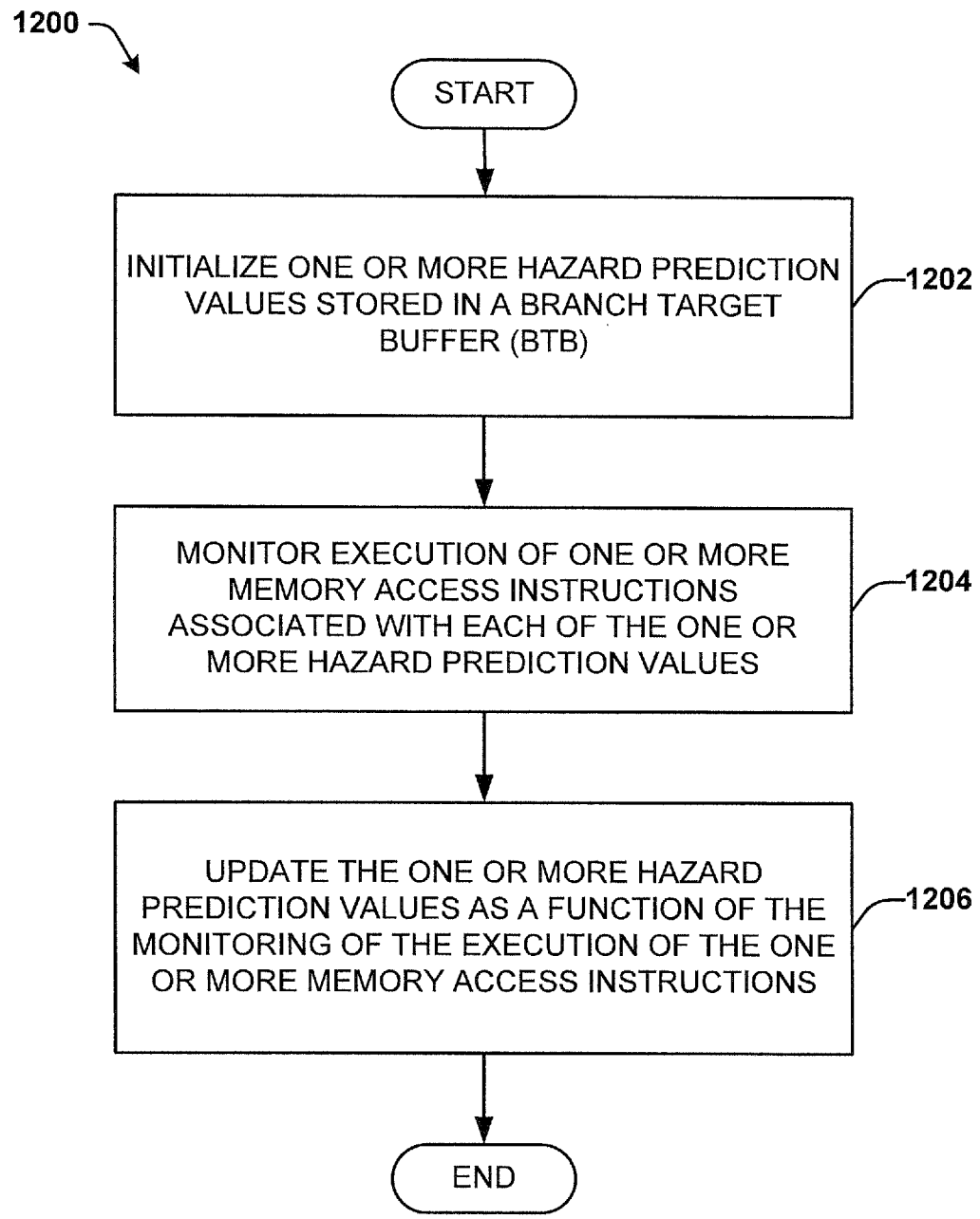
FIG. 12 illustrates a flow diagram of an example, non-limiting embodiment of a method for facilitating hazard prediction for one or more memory access instructions.

Referring now to FIG. 12, a flow diagram of an example, non-limiting embodiment of a method for facilitating hazard prediction for one or more memory access instructions is shown. Method 1200 can begin at block 1202, where one or more hazard prediction values stored in a branch target buffer (BTB) are initialized (e.g., by a prediction component 302). For example, one or more hazard prediction values stored in the BTB 202 can be initialized with an aggressive value.

At block 1204, execution of one or more memory access instructions associated with each of the one or more hazard prediction values are monitored (e.g., by a prediction component 302). For example, it can be determined whether an instruction pipeline hazard and/or a memory ordering pipeline hazard is associated with the one or more memory access instructions.

At block 1206, the one or more hazard prediction values are updated (e.g., by a prediction component 302) as a function of the monitoring of the execution of the one or more memory access instructions. For example, a particular hazard prediction value can be updated (e.g., with a conservative value) in response to at least a determination that a particular memory access instruction is associated with an instruction pipeline hazard and/or a memory ordering pipeline hazard. In an aspect, a particular hazard prediction value can be updated (e.g., with a conservative value) in response to a determination that an abort signal associated with the particular hazard prediction value (e.g., an abort signal indicating that an instruction pipeline hazard and/or a memory ordering pipeline hazard has occurred) has been generated.

Example Computing Environment

Figure 13:
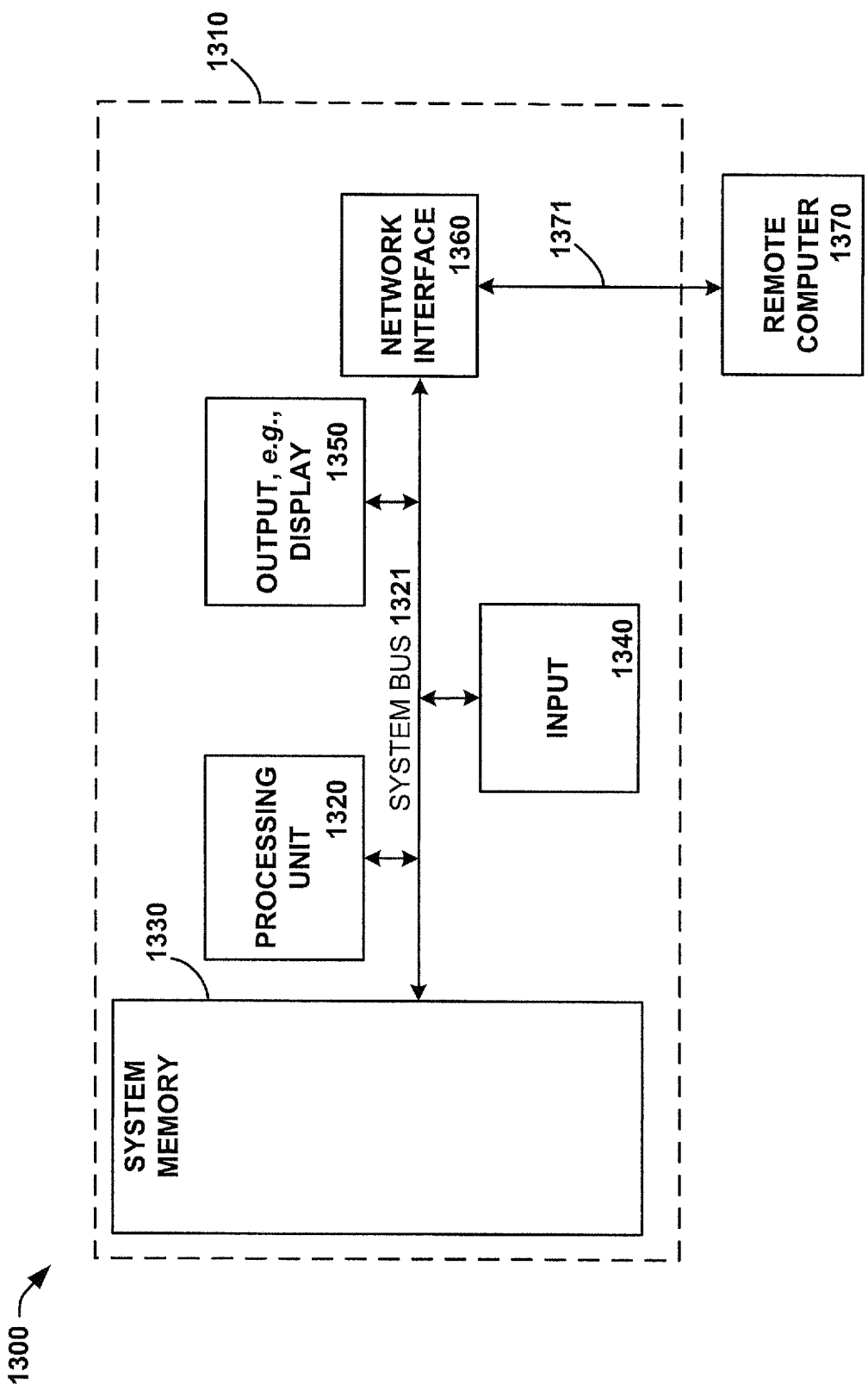
FIG. 13 illustrates a block diagram of an example electronic computing environment that can be implemented in conjunction with one or more aspects described herein.

As mentioned, advantageously, the techniques described herein can be applied to any device and/or network where prediction of memory hazards (e.g., instruction pipeline hazards, memory ordering pipeline hazards, etc.) is desirable. It is to be understood, therefore, that handheld, portable and other computing devices and computing objects of all kinds are contemplated for use in connection with the various non-limiting embodiments, i.e., anywhere that a device may wish to predict memory hazards (e.g., instruction pipeline hazards, memory ordering pipeline hazards, etc.). Accordingly, the below general purpose remote computer described below in FIG. 13 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 13 thus illustrates an example of a suitable computing system environment 1300 in which some aspects of the disclosed subject matter can be implemented, although as made clear above, the computing system environment 1300 is only one example of a suitable computing environment for a device and is not intended to suggest any limitation as to the scope of use or functionality of the disclosed subject matter. Neither should the computing environment 1300 be interpreted as having any dependency or requirement relating to any one or combination of components illustrated in the exemplary operating environment 1300.

With reference to FIG. 13, an exemplary device for implementing the disclosed subject matter includes a general-purpose computing device in the form of a computer 1310. Components of computer 1310 may include, but are not limited to, a processing unit 1320, a system memory 1330, and a system bus 1321 that couples various system components including the system memory to the processing unit 1320. The system bus 1321 may be any of several types of bus structures including a memory bus or memory controller, a peripheral bus, and a local bus using any of a variety of bus architectures.

Computer 1310 typically includes a variety of computer readable media. Computer readable media can be any available media that can be accessed by computer 1310. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1310. Communication media typically embodies computer readable instructions, data structures, program modules, or other data in a modulated data signal such as a carrier wave or other transport mechanism and includes any information delivery media.

The system memory 1330 may include computer storage media in the form of volatile and/or nonvolatile memory such as read only memory (ROM) and/or random access memory (RAM). A basic input/output system (BIOS), containing the basic routines that help to transfer information between elements within computer 1310, such as during start-up, may be stored in memory 1330. Memory 1330 typically also contains data and/or program modules that are immediately accessible to and/or presently being operated on by processing unit 1320. By way of example, and not limitation, memory 1330 may also include an operating system, application programs, other program modules, and program data.

The computer 1310 may also include other removable/non-removable, volatile/nonvolatile computer storage media. For example, computer 1310 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1321 through a non-removable memory interface such as an interface, and a magnetic disk drive or optical disk drive is typically connected to the system bus 1321 by a removable memory interface, such as an interface.

A user can enter commands and information into the computer 1310 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1320 through user input 1340 and associated interface(s) that are coupled to the system bus 1321, but may be connected by other interface and bus structures, such as a parallel port, game port, or a universal serial bus (USB). A graphics subsystem can also be connected to the system bus 1321. A projection unit in a projection display device, or a HUD in a viewing device or other type of display device can also be connected to the system bus 1321 via an interface, such as output interface 1350, which may in turn communicate with video memory. In addition to a monitor, computers can also include other peripheral output devices such as speakers which can be connected through output interface 1350.

The computer 1310 can operate in a networked or distributed environment using logical connections to one or more other remote computer(s), such as remote computer 1370, which can in turn have media capabilities different from device 1310. The remote computer 1370 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1310. The logical connections depicted in FIG. 13 include a network 1371, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1310 can be connected to the LAN 1371 through a network interface or adapter. When used in a WAN networking environment, the computer 1310 can typically include a communications component, such as a modem, or other means for establishing communications over the WAN, such as the Internet. A communications component, such as wireless communications component, a modem and so on, which can be internal or external, can be connected to the system bus 1321 via the user input interface of input 1340, or other appropriate mechanism. In a networked environment, program modules depicted relative to the computer 1310, or portions thereof, can be stored in a remote memory storage device. It will be appreciated that the network connections shown and described are exemplary and other means of establishing a communications link between the computers can be used.

Example Networking Environment

Figure 14:
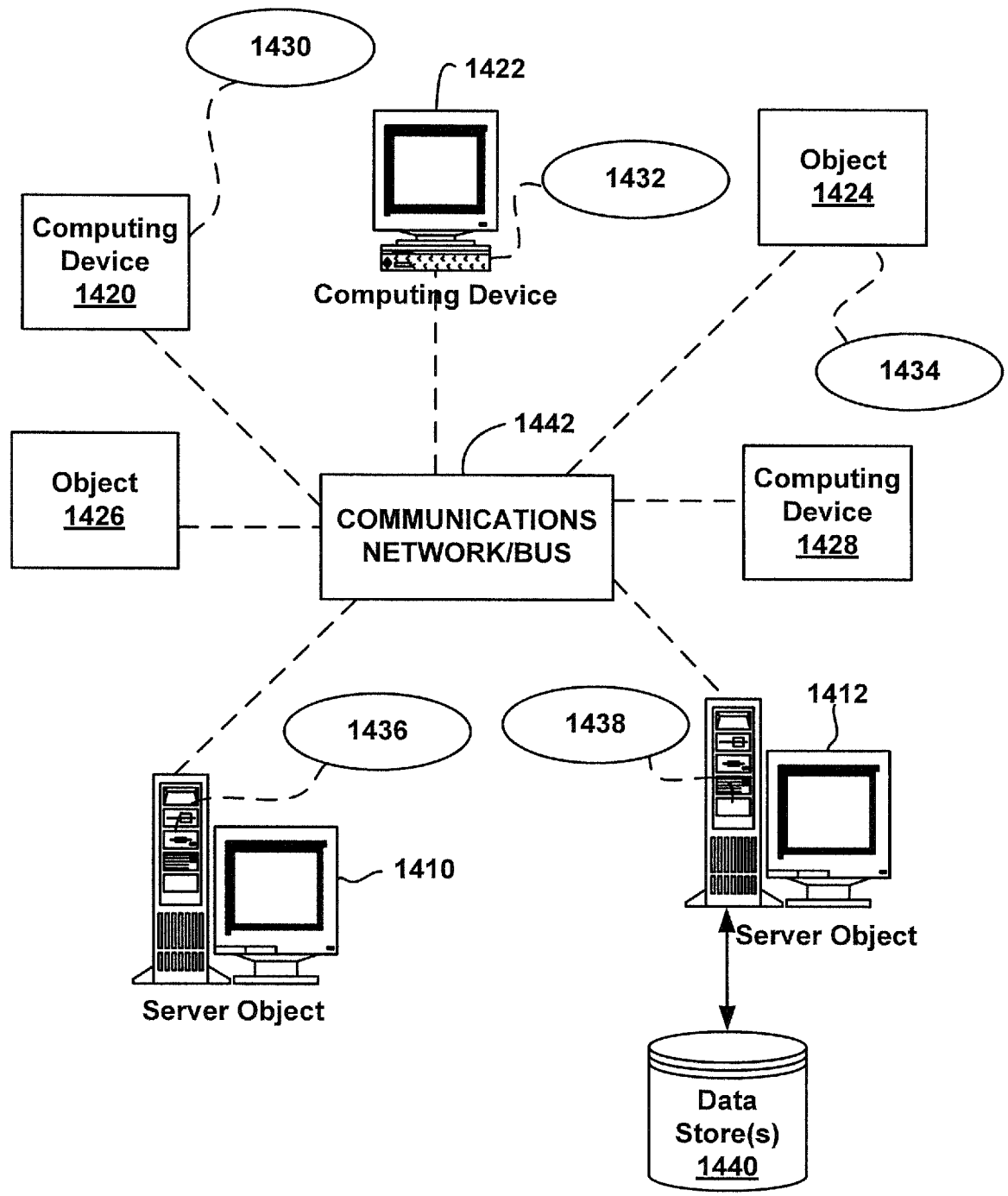
FIG. 14 illustrates a block diagram of an example data communication network that can be operable in conjunction with various aspects described herein.

FIG. 14 provides a schematic diagram of an exemplary networked or distributed computing environment. The distributed computing environment comprises computing objects 1410, 1412, etc. and computing objects or devices 1420, 1422, 1424, 1426, 1428, etc., which may include programs, methods, data stores, programmable logic, etc., as represented by applications 1430, 1432, 1434, 1436, 1438 and data store(s) 1440. It can be appreciated that computing objects 1410, 1412, etc. and computing objects or devices 1420, 1422, 1424, 1426, 1428, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1440 can include one or more cache memories, one or more registers, or other similar data stores disclosed herein.

Each computing object 1410, 1412, etc. and computing objects or devices 1420, 1422, 1424, 1426, 1428, etc. can communicate with one or more other computing objects 1410, 1412, etc. and computing objects or devices 1420, 1422, 1424, 1426, 1428, etc. by way of the communications network 1442, either directly or indirectly. Even though illustrated as a single element in FIG. 14, communications network 1442 may comprise other computing objects and computing devices that provide services to the system of FIG. 14, and/or may represent multiple interconnected networks, which are not shown. Each computing object 1410, 1412, etc. or computing object or devices 1420, 1422, 1424, 1426, 1428, etc. can also contain an application, such as applications 1430, 1432, 1434, 1436, 1438, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 14, as a non-limiting example, computing objects or devices 1420, 1422, 1424, 1426, 1428, etc. can be thought of as clients and computing objects 1410, 1412, etc. can be thought of as servers where computing objects 1410, 1412, etc., acting as servers provide data services, such as receiving data from client computing objects or devices 1420, 1422, 1424, 1426, 1428, etc., storing of data, processing of data, transmitting data to client computing objects or devices 1420, 1422, 1424, 1426, 1428, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1442 or bus is the Internet, for example, the computing objects 1410, 1412, etc. can be Web servers with which other computing objects or devices 1420, 1422, 1424, 1426, 1428, etc. communicate via any of a number of known protocols, such as the hypertext transfer protocol (HTTP). Computing objects 1410, 1412, etc. acting as servers may also serve as clients, e.g., computing objects or devices 1420, 1422, 1424, 1426, 1428, etc., as may be characteristic of a distributed computing environment.

Reference throughout this specification to "one embodiment," "an embodiment," "an example", "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one example," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system, comprising:
a memory storing computer executable components; and
a processor operably connected to the memory and configured to execute computer executable components comprising:
a fetch component having a cache memory and a buffer memory, the fetch component configured for receiving groups of memory access instructions from a main memory, the buffer memory of the fetch component comprising a first data structure configured for storing one or more hazard prediction values for each group of the memory access instructions received by the fetch component, the cache memory of the fetch component further comprising a second data structure configured for storing the groups of memory access instructions,
the fetch component configured for:
storing, in the first data structure included in the fetch component, the hazard prediction values for each group of memory access instructions received by the fetch component;
storing the groups of memory access instructions in the second data structure included in the fetch component; and
transmitting the memory access instructions stored in the second data structure from the cache memory to an execution component based on the hazard prediction values corresponding to the memory access instructions,
wherein the hazard prediction values are indicative of a likelihood of one or more of an instruction pipeline hazard, a memory ordering pipeline hazard, and a load/store ordering violation occurring in response to execution of a particular memory access instruction of the groups of memory access instructions,
wherein at least one hazard prediction value of the hazard prediction values is associated with at least one group of memory access instructions not stored in the second data structure included in the fetch component;
and the execution component comprising a third data structure configured for storing memory access instructions received from the second data structure included in the fetch component, the execution component configured for:
receiving a particular memory access instruction from the second data structure included in the fetch component, the particular memory access instruction being transmitted from the cache memory of the fetch component as a function of a corresponding hazard prediction value stored in the first data structure included in the fetch component, the corresponding hazard prediction value associated with a first group of memory access instructions, the first group of memory access instructions comprising the particular memory access instruction;
storing the particular memory access instruction in the third data structure to facilitate out-of-order execution of the particular memory access instruction in response to a determination that the corresponding hazard prediction value stored in the first data structure of the fetch component satisfies a defined criterion;
executing the particular memory access instruction without storing the memory access instruction in the third data structure in response to a determination that the associated hazard prediction value stored in the first data structure of the fetch component does not satisfy the defined criterion; and
upon executing the memory access instruction, updating the corresponding hazard prediction value for the particular memory access instruction of the first group of memory access instructions.

2. The system of claim 1, wherein the hazard prediction values are each configured as a bit value, and
wherein the buffer memory further stores branch prediction values for each group of memory access instructions.

3. The system of claim 1, wherein the fetch component is configured for updating the corresponding hazard prediction value in response to an instruction pipeline hazard associated with the particular memory access instruction, the instruction pipeline hazard being determined by a prediction component of the processor,
wherein the fetch component is configured for updating the corresponding hazard prediction value in response to an memory ordering pipeline hazard associated with the particular memory access instruction, the memory ordering pipeline hazard being determined by the prediction component of the processor, and
wherein the prediction component connects with the fetch component and the execution component.

4. The system of claim 1, wherein the first data structure in the buffer memory is a branch target buffer included in the fetch component.

5. The system of claim 1, wherein the fetch component is configured for storing, in the first data structure in the buffer memory included in the fetch component, a second hazard prediction value for predicting whether a second group of memory access instructions is associated with an instruction pipeline hazard.

6. The system of claim 1, wherein the first data structure is configured for providing a memory hazard history for the memory access instructions of the groups of memory access instructions by storing a greater number of hazard prediction values than a number of memory access instructions stored in the second data structure that stores the first group of memory access instructions comprising the memory access instruction.

7. The system of claim 1, wherein the first data structure in the buffer memory contains the hazard prediction values for more memory access instructions than the memory access instructions of the groups of memory access instructions stored in the second data structure of the cache memory.

8. The system of claim 1, further comprising a prediction component configured for monitoring the fetch component that is associated with a branch prediction pipeline for the memory access instructions, and monitoring the execution component that is associated with an execution pipeline for the memory access instructions to facilitate the prediction of the memory hazards.

9. The system of claim 8, wherein the prediction component is configured for initially assigning an aggressive value to the hazard prediction values in the first data structure, and wherein the prediction component is further configured for assigning a conservative value to at least one of the hazard prediction values in response to a determination that the memory access instruction is associated with an instruction pipeline hazard.

10. The system of claim 9, wherein the execution component is further configured for notifying the fetch component via a signal that the particular memory access instruction is associated with the instruction pipeline hazard in response to a determination that the particular memory access instruction has executed out-of-order.

11. The system of claim 1, wherein the execution component is configured for executing the particular memory access instruction by employing in-order execution in response to the determination that the hazard prediction value stored in the first data structure does not satisfy the defined criterion.

12. A computer implemented method, comprising:
storing, by a fetch component of a processor configured to receive memory access instructions from a main memory, at least one prediction entry in a first data structure of a buffer memory of the fetch component, the first data structure associated with a branch prediction pipeline, the prediction entry for predicting whether a first group of the memory access instructions received by the fetch component is associated with an instruction pipeline hazard;
storing the first group of the memory access instructions comprising a particular memory access instruction in a second data structure on a cache memory of the fetch component, the second data structure associated with the branch prediction pipeline;
receiving, at an execution component of the processor, the particular memory access instruction, wherein the particular memory access instruction is transmitted by the fetch component from the second data structure on the cache memory as a function of a respective prediction entry of the at least one prediction entry corresponding to the particular memory access instruction, wherein at least one additional prediction entry is associated with a group of memory access instructions not stored in the second data structure;
executing, by the execution component, the particular memory access instruction without storing the particular memory access instruction in a third data structure of the execution component in response to a determination that the respective prediction entry stored in the first data structure does not satisfy a defined criterion; and
updating, by the execution component and upon executing the particular memory access instruction, the respective prediction value for the particular memory access instruction of the first group of memory access instructions.

13. The computer implemented method of claim 12, further comprising updating the prediction entry as a function of the instruction pipeline hazard and the executing of the particular memory access instruction, the instruction pipeline hazard being determined by a prediction component of the processor,
wherein the fetch component is configured for updating the respective prediction value in response to an memory ordering pipeline hazard associated with the particular memory access instruction, the memory ordering pipeline hazard being determined by the prediction component of the processor, and
wherein the prediction component connects with the fetch component and the execution component.

14. The computer implemented method of claim 12, wherein the the method further comprises storing a second prediction entry for predicting whether a second group of memory access instructions is associated with an instruction pipeline hazard.

15. The computer implemented method of claim 12, wherein the storing the prediction entry in the first data structure comprises storing the prediction entry in a branch target buffer on the buffer memory.

16. The computer implemented method of claim 12, wherein the storing the memory access instructions in the second data structure comprises storing the particular memory access instruction and one or more other memory access instructions in an instruction cache of the cache memory, and
wherein a number of prediction entries stored on the buffer memory including the respective prediction entry is more than a number of memory access instructions stored in the second data structure on the cache memory.

17. The computer implemented method of claim 12, further comprising initially assigning an aggressive value to the prediction entry stored in the first data structure.

18. The computer implemented method of claim 12, further comprising assigning a conservative value to the prediction entry in response to a determination that the memory access instruction is associated with an instruction pipeline hazard, wherein the conservative value satisfies the defined criterion.

19. The computer implemented method of claim 18, further comprising, in response to a determination that the memory access instruction has executed out-of-order, generating a signal that indicates that the memory access instruction is associated with the instruction pipeline hazard.

20. The computer-implemented method of claim 12, further comprising:
   storing the particular memory access instruction in a third data structure to facilitate out-of-order execution of the particular memory access instruction in response to a determination that the respective prediction entry stored in the first data structure satisfies the defined criterion.

21. The computer-implemented method of claim 12, wherein a group of memory access instructions comprises one or more of a group of load instructions, a group of store instructions, or a group of different memory access instructions.

22. The computer-implemented method of claim 12, wherein the first data structure is further configured to store a branch prediction value for each group of memory access instructions.

23. A computing device, comprising:
   a buffer within a fetch component, the fetch component configured to receive memory access instructions from a main memory, the buffer configured for storing at least one hazard prediction entry indicative of a likelihood of an instruction pipeline hazard occurring in response to execution of a memory access instruction of a first group of memory access instructions;
   an instruction cache within the fetch component, the instruction cache configured for storing groups of the memory access instructions, wherein one of the at least one hazard prediction entry is associated with further groups of the memory access instructions not stored in the instruction cache, the instruction cache further configured for transmitting the memory access instructions to a queue buffer; and
   a processor comprising the queue buffer, the queue buffer configured for receiving a particular memory access instruction of the first group of memory access instructions from the instruction cache as a function of a respective hazard prediction entry of the at least one hazard prediction entry corresponding to the particular memory access instruction, the processor further configured for executing the particular memory access instruction stored in the instruction cache based on the respective hazard prediction entry received and stored at the queue buffer from in the buffer,
   wherein the processor is further configured for
   storing the memory access instruction in the queue buffer to facilitate out-of-order execution of the memory access instruction in response to a determination that the hazard prediction entry stored in the buffer satisfies a defined criterion;
   executing the memory access instruction without storing the memory access instruction in the queue buffer in response to a determination that the hazard prediction entry stored in the buffer does not satisfy the defined criterion; and
   updating, upon executing the particular memory access instruction, the respective hazard prediction entry for the particular memory access instruction of the first group of memory access instructions at the buffer.

* * * * *